US00RE43678E

(19) United States
(12) Reissued Patent
Major et al.

(10) Patent Number: US RE43,678 E
(45) Date of Reissued Patent: *Sep. 18, 2012

(54) WEB BROWSER OF WIRELESS DEVICE HAVING SERIALIZATION MANAGER FOR MAINTAINING REGISTRY OF CONVERTERS THAT CONVERT DATA INTO FORMAT COMPATIBLE WITH USER INTERFACE OF THE DEVICE

(75) Inventors: Harry R. Major, Waterloo (CA); Michael Knowles, Waterloo (CA)

(73) Assignee: Research In Motion Limited, Waterloo, Ontario (CA)

( * ) Notice: This patent is subject to a terminal disclaimer.

(21) Appl. No.: 13/246,896

(22) Filed: Sep. 28, 2011

Related U.S. Patent Documents

Reissue of:
(64) Patent No.: 7,596,631
Issued: Sep. 29, 2009
Appl. No.: 12/060,621
Filed: Apr. 1, 2008

U.S. Applications:
(63) Continuation of application No. 10/451,715, filed as application No. PCT/CA01/01857 on Dec. 21, 2001, now Pat. No. 7,389,361.

(60) Provisional application No. 60/257,428, filed on Dec. 22, 2000.

(51) Int. Cl.
*G06F 15/16* (2006.01)
(52) U.S. Cl. ..... 709/246; 709/216
(58) Field of Classification Search ..... 709/246, 709/216, 219; 715/760; 711/118; 345/581, 345/700
See application file for complete search history.

(56) References Cited

U.S. PATENT DOCUMENTS

| | | | | |
|---|---|---|---|---|
| 4,837,798 | A | 6/1989 | Cohen et al. | |
| 5,675,507 | A | 10/1997 | Bobo, II | |
| 5,829,022 | A * | 10/1998 | Watanabe et al. | 711/118 |
| 5,978,833 | A | 11/1999 | Pashley et al. | |
| 6,029,175 | A | 2/2000 | Chow et al. | |
| 6,105,028 | A | 8/2000 | Sullivan et al. | |
| 6,631,512 | B1 | 10/2003 | Onyeabor | |

(Continued)

FOREIGN PATENT DOCUMENTS

CA 2432590 8/2010

(Continued)

OTHER PUBLICATIONS

"Multi-Modal Data Access", Research Disclosure, Kenneth Mason Publications, Hampshire, GB, No. 426, Oct. 1999, pp. 1393-1396.

(Continued)

*Primary Examiner* — Le H Luu
(74) *Attorney, Agent, or Firm* — Bereskin & Parr LLP/S.E.N.C.R.L., s.r.l.

(57) ABSTRACT

An information browser system and method enables sending of information requests to remote information sources and receiving of requested information from the remote sources on a wireless communication device. Information in any of a plurality of formats, including WML, HTML and WMLScript, is converted into a format in which the information can be displayed or otherwise further processed by the device. Information browsing functions may also be integrated with other communication functions on a mobile communication device.

22 Claims, 15 Drawing Sheets

U.S. PATENT DOCUMENTS

| | | | | |
|---|---|---|---|---|
| 6,901,437 | B1 * | 5/2005 | Li | 709/219 |
| 7,050,079 | B1 * | 5/2006 | Estrada et al. | 715/760 |
| 7,389,361 | B2 | 6/2008 | Major et al. | |
| 7,596,631 | B2 | 9/2009 | Major et al. | |
| 7,761,603 | B2 | 7/2010 | Major et al. | |
| RE41,786 | E | 9/2010 | Major et al. | |
| 2002/0015042 | A1 * | 2/2002 | Robotham et al. | 345/581 |
| 2002/0049833 | A1 * | 4/2002 | Kikinis | 709/219 |
| 2002/0109706 | A1 * | 8/2002 | Lincke et al. | 345/700 |
| 2004/0165007 | A1 | 8/2004 | Shafron | |
| 2010/0281391 | A1 | 11/2010 | Major et al. | |

FOREIGN PATENT DOCUMENTS

| | | | |
|---|---|---|---|
| EP | 0 911 728 | A1 | 4/1999 |
| EP | 0911728 | | 4/1999 |
| EP | 0 987 868 | A2 | 3/2000 |
| EP | 0987868 | | 3/2000 |
| EP | 1638020 | | 3/2006 |
| EP | 1643381 | | 4/2006 |
| EP | 2267619 | | 12/2010 |
| EP | 1428348 | | 1/2011 |
| GB | 2332126 | | 6/1999 |
| GB | 2 332 126 | A | 9/1999 |
| GB | 2340001 | | 2/2000 |
| GB | 2340001 | A | 9/2000 |
| HK | 1065199 | | 10/2004 |
| WO | 97/35402 | | 9/1997 |

OTHER PUBLICATIONS

Freytag, et al.: "Resource Adaptive WWW Access for Mobile Applications", Computers and Graphics, Pergamon Press Ltd., Oxford, GB, vol. 23, No. 6, Dec. 1999, pp. 841-848.

Schilit, et al.: "TeleWeb: Loosely Connected Access to the World Wide Web", Computer Networks and ISDN Systems, North Holland Publishing, Amsterdam, NL, vol. 28, No. 11, May 1996, pp. 1431-1444.

"Archiving Agent for the World Wide Web", IBM Technical Disclosure Bulletin, IBM Corp., New York, United States, vol. 40, No. 6, Jun. 1997, pp. 33-34.

European Patent Communciation re: European Patent Application No. 01 995 527.7, dated Jan. 19, 2006.

Hoff L.: "Netscape Plug-Ins", On-line Publication, Sep. 1, 1999 URL: http://www.linusjournal.com/article/3088.

Bjork S. et al.: "WEST: A Web Browser for Small Terminals", Proceedings of the Symposium on User Interface Software and Technology UIST, Nov. 1999, Asheville, USA.

European Search Report, Application No. 05077803.4, dated Dec. 27, 2006.

Ball, Steve, "SurfIt! A WWW Browser" Proceedings of the Usenix Fourth Annual TCL/TK Workshop, Jul. 1996 (Jul. 1996), Monterey, USA, Retrieved from the Internet: http//www.usenix.org/publications/library/proceedings/tcl96/full_papers/ball/> [retrieved on Apr. 4, 2008].

Koppen, Eckhart et al., "Cineast—An Extensible Web Browser" Proceedings of the Webnet World Conference on WWW, Internet and Intranet, Nov. 1997 (Nov. 1997), Toronto, Canada, Retrieved from the Internet: http://nm.wu-wien.ac.at/nm/pages/en/re search> [retrieved on Apr. 4, 2008].

European Examination Report. Application No. 05077803.4, Dated: Apr. 8, 2008.

Canadian Office Action Application No. 2,432,590. Dated: Oct. 14, 2008.

Co-pending U.S. Appl. No. 12/838,721, "Information Browser System and Method for a Wireless Communication Device", filed Jul. 19, 2010.

Decision to refuse a European Patent application. European Application No. 05077803.4. Dated: Mar. 29, 2011.

Office Action U.S. Appl. No. 12/838,721, Dated: Sep. 28, 2011.

Extended European Search Report (EESR). European Application No. 10181228.7, Dated: Nov. 18, 2010.

Communication Pursuant to 94(3) EPC. European Application No. 10181228.7, Dated: Sep. 12, 2011.

Bickmore T. W. et al., "Digestor: Device-independent access to the World Wide Web", Computer Networks and ISDN Systems, North Holland Publishing. Amsterdam, NL LNKD-DOI: 10.1016/S0169-7552(97)00026-3, vol. 29, No. 8-13, Sep. 1, 1997, pp. 1075-1082, XP004095305.

"User Manual of the Nokia 9000i Communicator passage EN", Users Manual of the Nokia 9000i Communicator, Nokia, FI, Jul. 7, 1998, page Complete, XP002409380.

DeLespinasse, Alan F., "Rover Mosaic: E-mail Communication for a Full-Function Web Browser", citeseer copy of Thesis submitted to MIT, Jun. 1995. XP002607844. Retrieved from the Internet [Nov. 1, 2010]: http://citeseerx.ist.psu.edu/viewdoc/summary?doi=10.1.1.51.9761.

Bartlett J. F. Ed—Institute of Electrical and Electronics Engineers: "Experience with a Wireless World Wide Web Client", Digest of papers of the Computer Society Computer Conference (Spring) Compcon. Technologies for the Information Superhighway. San Francisco, Mar. 5-9, 1995. Vol. Conf. 40, Mar. 5, 1995, pp. 154-157, XP000545425.

Szyperski C: "Component Software" 1998, ACM Press, XP002607845, pp. 3-13, 84-87. ISBN: 0-201-17888-5.

Noting of Loss Of Rights (R.69 (1) EPC). European Application No. 05077803.4. Dated: Aug. 14, 2008.

Communication Pursuant to Article 96(2) EPC. European Application No. 05077802.6. Dated: Apr. 28, 2006.

Communication under Rule 112 EPC. European Application No. 01995527.7. Dated: Jul. 2, 2004.

Communication pursuant to Article 96(2) EPC. European Application No. 01995527.7. Dated: Dec. 22, 2004.

Summons to attend oral proceedings pursuant to Rule 71(1) EPC. European Application No. 01995527.7. Dated: Sep. 15, 2005.

Brief Communication. European Application No. 01995527.7. Dated: Dec. 6, 2005.

Summons to oral proceedings pursuant to Rule 115(1) EPC. European Application No. 01995527.7. Dated: Nov. 2, 2009.

Communication of the Technical Board of Appeal 3.5.05 of Feb. 2, 2010. European Application No. 01995527.7. Dated: Apr. 21, 2010.

Communication Under Rule 71(3) EPC. European Application No. 01995527.7. Dated: Jun. 23, 2010.

Notice of Allowance. Canadian Application No. 2,432,590. Dated: Jan. 5, 2010.

B.J. Thomas: "The World Wide Web for Scientists & Engineers", Glossary p. 337, SPIE Press, 1998, ISBN 0-8194-2775-6.

European Search Report. European Application No. 05077802.6. Dated: Apr. 11, 2006.

European Partial Search Report. European Application No. 05077802.6. Dated: Feb. 3, 2006.

European Partial Search Report. European Application No. 05077803.4. Dated: Feb. 15, 2006.

Canadian Office Action Application No. 2,432,590. Dated: Mar. 24, 2005.

Canadian Office Action Application No. 2,432,590. Dated: Nov. 2, 2005.

Summons to attend Oral Proceedings Pursuant to Rule 115(1). European Application No. 05077803.4. Dated: Nov. 18, 2010.

Brosius, Felix, "WML—WAP-Anwendungen programmieren", Addison-Wesley 2000.

Graham, Ian S., "XHTML 1.0 Web Development Sourcebook: Building Better Sites and Applications", Wiley Computer Publishing 2000.

Hougland, Damon et al., "Essential WAP for Web Professionals", Prentice Hall PTR 2001.

Hubbell, Arlyn, "Understanding Web Development", Prentice Hall PTR 2000.

Krutwig, Michael et al., "WML und WMLScript", dpunkt.verlag 2001.

Response. European Application No. 01995527.7. Dated: Jun. 16, 2005.

Response. European Application No. 01995527.7. Dated: Jul. 14, 2004.

Response. European Application No. 01995527.7. Dated: Dec. 31, 2009.

Response. European Application No. 01995527.7. Dated: Nov. 16, 2005.

Decision to refuse a European patent application. European Application No. 01995527.7. Dated: Jan. 19, 2006.
Minutes of the public oral proceedings before the Technical Board of Appeal 3.5.05. European Application No. 01995527.7. Dated: Feb. 2, 2010.
Decision to grant a European patent pursuant to Article 97(1) EPC. European Application No. 01995527.7. Dated: Dec. 30, 2010.
Written Opinion and International Search Report. PCT/CA01/01857. Dated: Sep. 24, 2003.
Extended European Search Report. European Application No. 05077803.4. Dated: May 9, 2006.
Decision on further processing under Article 121(3) EPC. European Application No. 05077803.4. Dated: Nov. 8, 2007.
Provision of a copy of the minutes in accordance with Rule 124(4) EPC. European Application No. 05077803.4. Dated: Mar. 29, 2011.
Response. European Application No. 05077803.4. Dated: Sep. 19, 2008.
Written Submissions. European Application No. 05077803.4. Dated: Feb. 15, 2011.
Letter regarding Written Submissions. European Application No. 05077803.4. Dated: Feb. 17, 2011.
Acknowledgement of withdrawal of the European patent application. European Application No. 05077802.6. Dated: Sep. 25, 2006.
Response. European Application No. 10181228.7. Dated: Jun. 29, 2011.
Response. European Application No. 10181228.7. Dated: Jan. 13, 2012.
European Patent Communication re: European Patent Application No. 01 995 527.7, dated Jan. 19, 2006.
Hoff L.: "Netscape Plug-Ins", On-line Publication, Sep. 1, 1999, URL: http://www.linusjournal.com/article/3088.
Ball, Steve, "SurfIt! A WWW Browser" Proceedings of the Usenix Fourth Annual TCL/TK Workshop, Jul. 1996, Monterey, USA, Retrieved from the Internet: http:www.usenix.org/publications/library/proceedings/tcl96/full_papers/ball/> [retrieved on Apr. 4, 2008].
Koppen, Eckhart et al., "Cineast—An Extensible Web Browser" Proceedings of the Webnet World Conference on WWW, Internet and Intranet, Nov. 1997, Toronto, Canada, Retrieved from the Internet: http://nm.wu-wein.ac.at/nm/pages/en/re search> [retrieved on Apr. 4, 2008].
European Examination Report Application No. 05077803.4. Dated: Apr. 8, 2008.
Co-pending Reissue of U.S. Patent No. 7,389,361. U.S. Appl. No. 12/361,161, "A Web Browser of Wireless Device Having Serialization Manager for Maintaining Registry of Converters that Convert Data into Format Compatible with User Interface of the Device", filed Jan. 28, 2009.

* cited by examiner

WEB BROWSER OF WIRELESS DEVICE HAVING SERIALIZATION MANAGER FOR MAINTAINING REGISTRY OF CONVERTERS THAT CONVERT DATA INTO FORMAT COMPATIBLE WITH USER INTERFACE OF THE DEVICE

Matter enclosed in heavy brackets [ ] appears in the original patent but forms no part of this reissue specification; matter printed in italics indicates the additions made by reissue.

CROSS REFERENCE TO RELATED [APPLICATION] *APPLICATIONS*

This application is a *reissue application of U.S. Pat. No. 7,596,631 that issued on Sep. 29, 2009 from U.S. patent application Ser. No. 12/060,621 filed on Apr. 1, 2008, which is a* continuation of prior U.S. patent application Ser. No. 10/451,715, filed on Jun. 20, 2003, [now] *which* issued as U.S. Pat. No. 7,389,361 *on Jun. 17, 2008, and* which [was] *re-issued as U.S. Reissue Pat. No. RE41,786 on Sep. 28, 2010 from U.S. Reissue patent application Ser. No. 12/361,161 filed on Jan. 28, 2009, U.S. patent application Ser. No. 10/451,715 being* the National Stage of International Application No. PCT/CA01/01857, filed Dec. 21, 2001, *which claims the benefit of U.S. provisional application Ser. No. 60/257,428 filed Dec. 22, 2000*; the entirety of U.S. patent application Ser. No. 10/451,715 is hereby incorporated by reference.

FIELD OF THE INVENTION

The present invention relates to browsing information content in World Wide Web (WWW) pages accessed using a wireless device.

BACKGROUND OF THE INVENTION

Accessing browsable information such as Web content on the Internet is a part of everyday life for many people today. Most users currently access such information content by using computer systems that are physically connected to the Internet via a modem and physical wires of some sort, typically a telephone line or coaxial cable. At the same time, wireless devices and the wireless networks they work on are becoming more widely available. Many modern wireless networks are connected or at least connectable to the Internet. As such, the demand for browsers on wireless devices that can access the World Wide Web is increasing rapidly.

Wireless devices and the associated wireless networks within which they operate present several design challenges not normally encountered in standard wired networks. First, unlike personal computers (PCs) and servers that are wired to the network, mobile and other wireless devices are connected to the network using radio links. As such, they are only connected when the device is "in range", or within coverage of one of the wireless network's radio transmitters. Because the wireless networks do not completely cover all areas where users will be using the devices, connectivity to the networks can be frequently gained and lost. No connectivity guarantees can be made at any given point in time.

Furthermore, even when a device is connected to a wireless network, the bandwidth of such networks can be quite low. Current networks, such as Mobitex™ and Datatac™, operate in the 9.6 kilo-bit per second (kbps) to 14.4 kbps range. Newer networks, such as General Packet Radio Service (GPRS) and the Global System for Mobile Communications (GSM), will operate in the 20 kbps to 110 kbps range. As will be apparent to those skilled in the art, this range relates to raw speed. Real speed is lower when retransmissions of corrupted packets and network congestion are accounted for. So-called third generation networks, such as Universal Mobile Telecommunications System (UMTS), are expected to operate in the 384 kbps range or higher, but are not expected to be deployed for at least several years.

Most mobile devices also currently have much lower screen resolution and processing power than typical PCs or laptops. For example, known mobile devices tend to have screen resolution on the order of 160×160×1 bit (monochrome) or smaller, as compared to low-end desktop PC or laptop monitor resolution of 1024×768×24 bits.

For a user, these factors make the browsing experience on mobile devices considerably different from that on computers with wired network connections. From the perspective of service providers and device manufacturers, such characteristics of wireless devices and wireless networks hinders the provision of browsing capabilities in wireless systems. In particular, much of the information content on wired networks assumes that a computer or device will be connected to the network for the duration of the browsing session. In addition, content is increasingly being geared towards bandwidths of 128 kbps or higher and to high-resolution screens and computers with extensive processing power to support animations, large graphics, and the like.

The Wireless Application Protocol (WAP) Forum was created to address incompatibilities between the capabilities of current mobile devices and wireless networks and the various processing, memory and display requirements for viewing different types of Web content. The result was the WAP specification, a de-facto worldwide standard, which includes both a protocol to deliver Web content to wireless devices, and a new form of markup, called Wireless Markup Language (WML). WML is geared towards providing the essence of high-value web pages for extremely small devices such as cellular telephones.

The WAP protocol addresses the issue of delivering content to wireless devices on slow, unreliable networks. However, although WML allows content to be developed for cell phones, it is not clear that it is as appropriate for personal digital assistant (PDA) style mobile devices, which have larger screens and tend to have more processing power than most cell phones.

The continuing movement towards web-based user interfaces for wireless communication devices, coupled with a general sentiment that Hypertext Markup Language (HTML) and WML provide inadequate user interface controls, is expected to result in an increasing demand for mechanisms to extend basic browsing capabilities. Browser extensibility will therefore likely become an important part of mobile device application platforms.

Therefore, there is a need for a Web content browser for wireless devices, which provides browsing functionality similar to that of conventional Web browsers designed for hard-wired network connected devices. Such a browser should overcome the above problems associated with browsing information on a wireless device and should be compatible with multiple information content types. There is a further need for such a browser to be integrated with other functions of wireless communication devices.

SUMMARY OF THE INVENTION

According to an embodiment of the invention, a web browser comprises a page cache containing a plurality of pages in a plurality of formats, and a converter and renderer operatively connected to the page cache for rendering the plurality of pages for display by the browser.

In accordance with a further aspect of the invention, a wireless web browser comprises a radio configured for communications with both a Wireless Application Protocol (WAP) gateway and an Internet Protocol (IP) proxy server.

A web browser according to another aspect of the invention has a background processing object, the background processing object permitting the browser to access information after the browser has been closed.

According to a further aspect of the invention, a web browser comprises a message store, the message store connected to at least one application selected from the set of: email application, voicemail application and SMS application, and the message store containing objects retrieved by the browser and the least one application.

In another embodiment of the invention, a computer readable medium comprises instructions for implementing a page cache, a renderer controller operatively connected to the page cache and a serialization manager operatively connected to the renderer controller.

A method for installing a converter on a wireless device according to a still further aspect of the invention comprises the steps of determining if the converter is registered on the wireless device, if the converter is registered, then requesting the converter via a wireless network, and when the converter is received in response to the request, installing the converter on the wireless device.

A method for rendering a page on a wireless communication device, in another aspect of the invention, comprises the steps of receiving the page over a wireless network, selecting a converter for the page, rendering the page to created a rendered page for display by a browser, and storing the rendered page in a page cache.

In another embodiment of the invention, a browser for a wireless device comprises a browser object operatively connected to a browser daemon, a stack manager operatively connected to the browser object and the browser daemon, the stack manager further connected to a wireless radio via a plurality of interface adapters, and the radio connected to a plurality of communication links, the communication links providing information to and sending information from the browser object and the browser daemon.

A computer readable medium comprising instructions for implementing a browser for a wireless device according to a further embodiment of the invention comprises instructions for implementing a browser object and a browser daemon, the browser object and the browser daemon communicating with each other, instructions for implementing a stack manager, the stack manager in communication with the browser object and the browser daemon, instructions for implementing a plurality of interface adapters, the interface adapters in communication with the stack manager and a wireless radio, and instructions for connecting the radio to a plurality of communication links, the communication links providing information to and sending information from the browser object and the browser daemon.

BRIEF DESCRIPTION OF THE DRAWINGS

For a better understanding of the present invention, and to show more clearly how it can be carried into effect, reference will now be made, by way of example only, to the accompanying drawings in which.

DETAILED DESCRIPTION OF THE INVENTION

A browser according to an aspect of the present invention is generic in the sense that it preferably displays content from WML, HTML and new formats as they become available. Subsequent references in this description to WML and HTML type content are intended to include not only WML and HTML, but also other content types or formats which are or may become available. Many browser functions are common across all content types, whereas other functions are specific to the content type, as will become clear from the following description. The browser will preferably be able to switch between different content types as determined by the type of content returned to the browser in response to an information or content request.

Figure 1:
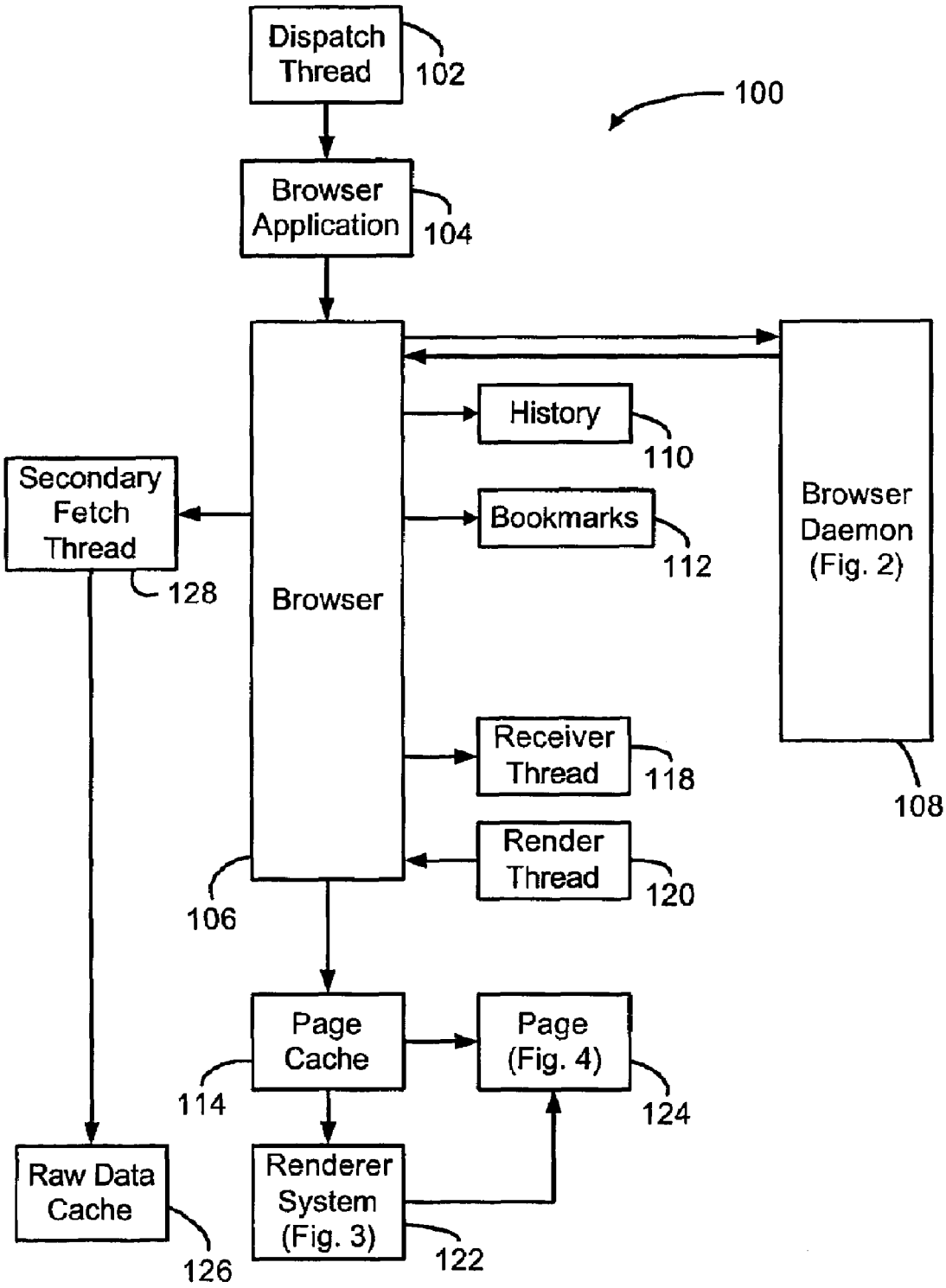
FIG. 1 is a block diagram of objects and components in an embodiment of the present invention.

Referring now to FIG. 1, a block diagram of objects and components in an embodiment of the present invention, is shown generally as 100. FIG. 1 illustrates a software implementation of browser 100, with the arrows representing references between the objects and components. The invention is preferably implemented primarily in software, but may also be implemented at least partially in hardware.

As described above, generic and content-specific functionality and related software objects are separate. Dispatch thread 102 is the main event thread of system 100 and notifies browser application object 104 of all user inputs and communication events. In order to ensure a responsive user interface (UI), processing times for such events should be limited. Browser application object 104 is the parent application object, which basically functions as a container for the object shown as browser object 106. Browser object 106 is a transient process while browser daemon 108 is a persistent process. Browser daemon 108 always runs in the background and supports all the fetching operations. It also automatically loads previously fetched Uniform Resource Locators (URLs) into the message list, as will become apparent from the description below.

Browser object 106 and browser daemon 108 perform "generic" browser functions that apply to WML, HTML, WMLScript and any other content types that may be received or otherwise encountered. This includes such functions as history management, control of page retrieval and display, control of image retrieval and display, creation and handling of menus, detection and execution of scripts and the like.

History object 110 is the navigation history, essentially a memory stack of pages or more particularly the URLs associated with the pages that have been most recently accessed. History object 110 can be queried to determine whether or not it is empty. Based on this determination, browser 100 enables or disables "Forward" and "Back" functions for example.

Bookmarks object 112 is a store of all the bookmarks currently known to browser 100. The contents of the bookmarks object are controlled by a user, through add, delete, arrange and such bookmark operations.

Browser object 106, as discussed briefly above, is a transient object which is opened and closed by a user. When the user asks to see a new URL, the browser object 106 first asks the page cache 114 if the page object corresponding to the URL is available. If it is, the browser object 106 displays it, via a display or screen user interface object (not shown). Otherwise, browser object 106 creates a fetch request object and sends that fetch request object to the browser daemon 108. Browser daemon 108, in turn, processes the fetch request object (as discussed further below) and sends a result back to browser object 106. When browser daemon 108 receives a response to a fetch request object, it places data from the response into the fetch request and changes a state of the fetch request object to "received". Browser object 106 has an associated receiver thread 118 for each request that waits for a request to change to "received" state. When a response is received, receiver thread 118 creates a render thread 120 to process that result. This scheme eliminates the need for a received results queue or the like and thereby conserves memory resources on a device in which a browser such as shown in FIG. 1 is implemented. However, it should be appreciated that other aspects of the invention are also applicable to systems which utilize a results queue.

Render thread 120 provides the result to page cache 114 and asks for a corresponding page object 124 in return. Page cache 114, in turn, delegates to renderer system 122 to produce page object 124 from the result. When renderer system 122 returns page object 124, page cache 114 will store it.

If an information request is outstanding or in process when browser object 106 is closed, when browser daemon 108 is ready to forward that result to browser object 106, browser daemon 108 will detect that browser object 106 no longer exists. In such a case, browser daemon 108 will optionally store the result as a browser message in a message store (not shown). Such functionality is described in more detail below.

Page cache 114, as its name implies, is a cache of page objects 124. If the page object corresponding to a requested Uniform Resource Locator (URL) is in page cache 114, it can be displayed by the browser object 106 very quickly. As is common in the art, page cache 114 employs a least recently used (LRU) replacement policy.

Raw data cache 126 is a cache that stores the raw bytes for all requested content, including HTML pages, WMLC decks, images, compiled WMLScript scripts and any other requested content formats. Like the page cache 114, it also employs a LRU replacement policy.

Secondary fetch threads 128 are used to process secondary fetch operations, such as loading images and are initiated by browser object 106. Primary fetch operations, such as fetching pages, are preferably performed as background operations by browser daemon 108 (FIG. 2).

Figure 2:
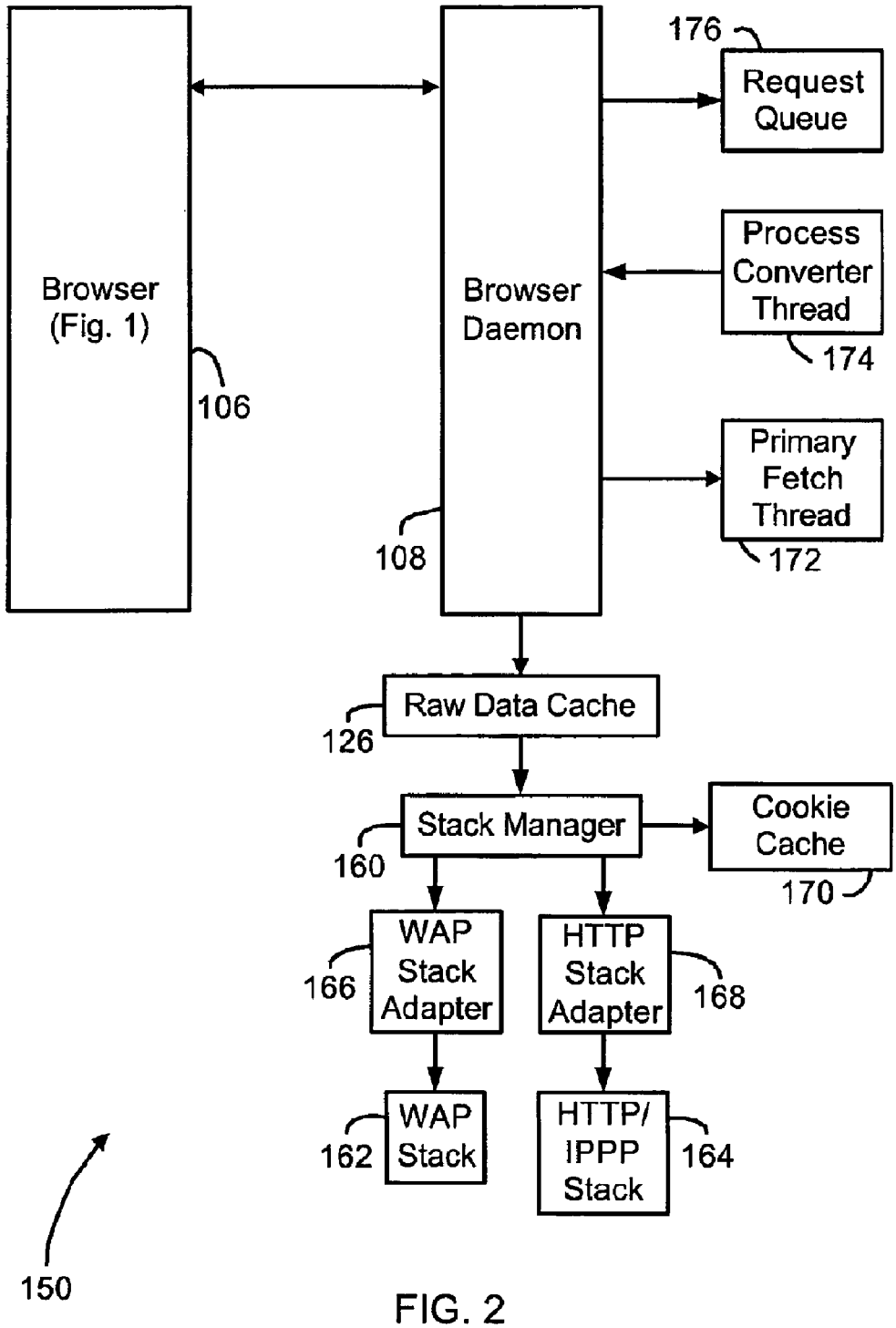
FIG. 2 is a block diagram of objects and components associated with a browser daemon.

Referring now to FIG. 2 a block diagram of objects and components associated with a browser daemon is shown generally as 150. Stack manager 160 manages all requests for content, directing them to the appropriate stack. Stack manager 160, in conjunction with renderer system 122 (FIG. 3), provides for the multiple content format functionality of browser 100 and the device in which it is installed. Stack manager 160 is associated with both a WAP stack 162 and an HTTP stack 164 through WAP stack adapter object 166 and HTTP stack adapter object 168 respectively. In a preferred embodiment, HTTP stack 164 is a proprietary HTTP-over-IPPP (IP Proxy Protocol) stack, discussed in further detail below. Thus, a wireless device equipped with a browser 100 can access information using not only WAP, as in prior art wireless devices, but also HTTP.

For each URL that is not in page cache 114 or raw data cache 126 an instance of a primary fetch thread 172 is created to fetch the requested data. Cookie cache 170 stores cookies associated with previously accessed or downloaded information content. Some information sources may for example require a user to login using a user name and password, either or both of which may be stored as a cookie in cookie cache 170. Process converter thread 174 is a worker thread that retrieves fetch requests from the request queue 176 and creates instances of primary fetch thread 172 to process the request. Request queue 176 is a queue that contains requests for information from browser daemon 108. As resources permit, an item on request queue 176 will be initiated as a primary fetch thread 172. Data received in response to requests from the browser daemon 108 will preferably be added to fetch requests in the request queue 176 and the status of such requests changed to "received", as described above.

Figure 3:
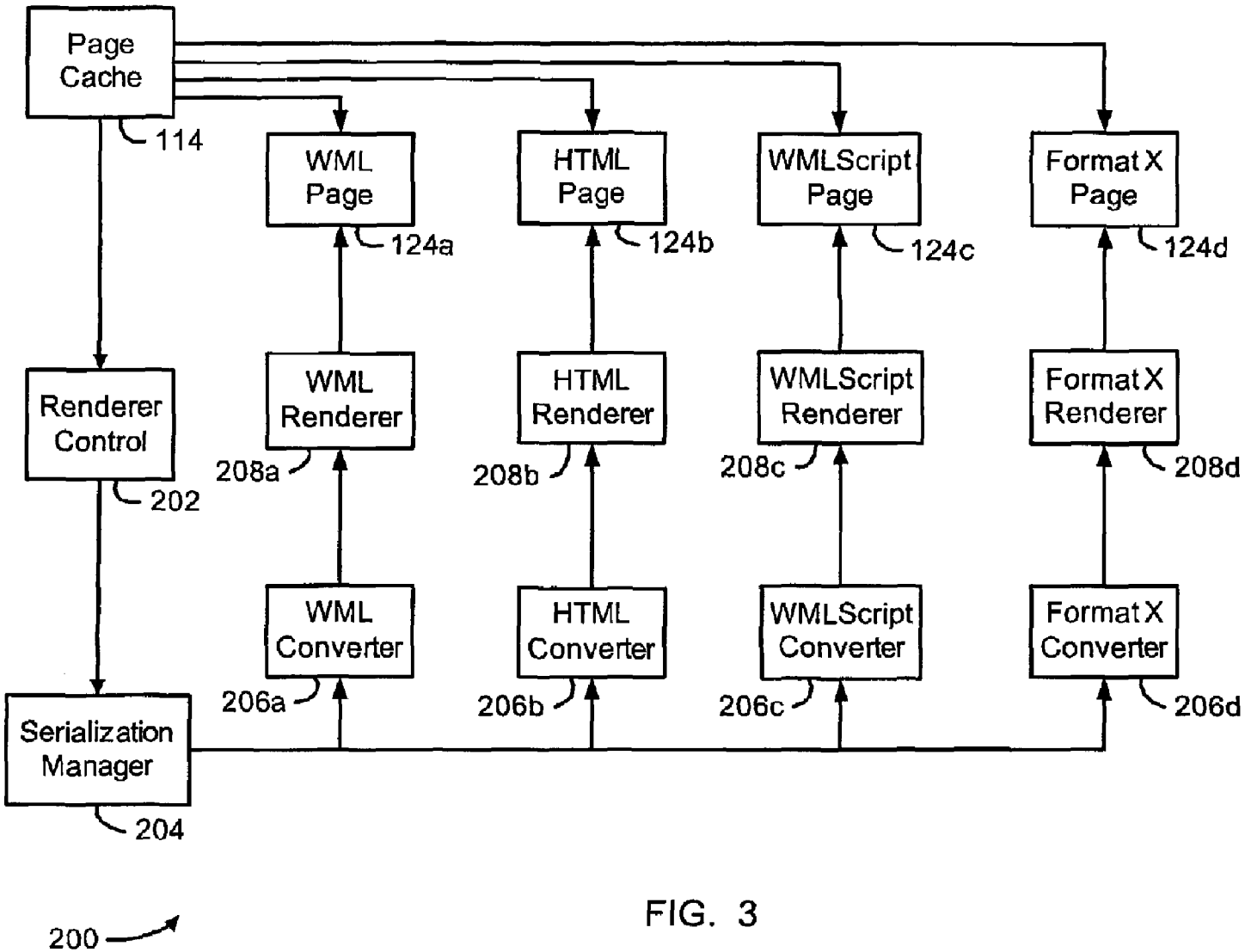
FIG. 3 is a block diagram of objects and components associated with a renderer system.

Referring now to FIG. 3 a block diagram of objects and components associated with a renderer system is shown generally as 200. In response to a page object request, renderer control object 202 will examine the resultant content type to determine which converter and renderer objects are required to generate a page object. Serialization manager 204 determines if the required converter object is resident on the device and if so, calls the appropriate converter object (206a, 206b, 206c, 206d). Converter object 206 converts the raw input data into an object that can be rendered. Converter object 206 creates an appropriate renderer object (208a, 208b, 208c, 208d) to render the data and produce a page object (124a, 124b, 124c, 124d) and return the new page object to the page cache 114. The new page object, which contains screen user interface (UI) components, will also be displayed to a user by the browser object 106. All pages generated by the converters and renderers are compatible with the particular display UI implemented in the wireless device.

Serialization manager 204 maintains a registry of format converters for different information formats. In a preferred embodiment of the invention, a third party communicates with serialization manager 204 to register new format converter/renderer combinations such as the Format X converter object 206d. Information formats other than those corresponding to converter objects provided on the device by a manufacturer can thereby be rendered and displayed by the device by simply installing the appropriate converter objects, which creates associated renderer objects as required.

When content is returned to the wireless device in response to an information request, the renderer controller 202, in conjunction with the serialization manager 204, determines the type of content, the converter and renderer objects required to convert the content into a page object, and whether or not the required converter and renderer objects are available on the device. If the required converter is registered with the serialization manager 204, then the converter is called to convert the byte array into a page. Serialization manager 204 returns a null value to renderer controller 202 when a required converter object is not registered.

Where received information is in a format other than those for which a converter object is registered with the serialization manager 204, the device may not be capable of displaying the information. According to a further aspect of the invention, a remote system or server in the network within which the wireless device is operating may register non-resident converter and renderer objects as being available to the device. In such systems, when information received in response to an information request is in a format requiring converter and renderer objects not resident on the device but registered with the serialization manager 204 as non-resident converter objects, serialization manager 204 requests and downloads the required converter object. Serialization manager 204 thereby significantly expands the browsing capabilities of the wireless device in comparison with prior art devices.

Figure 4:
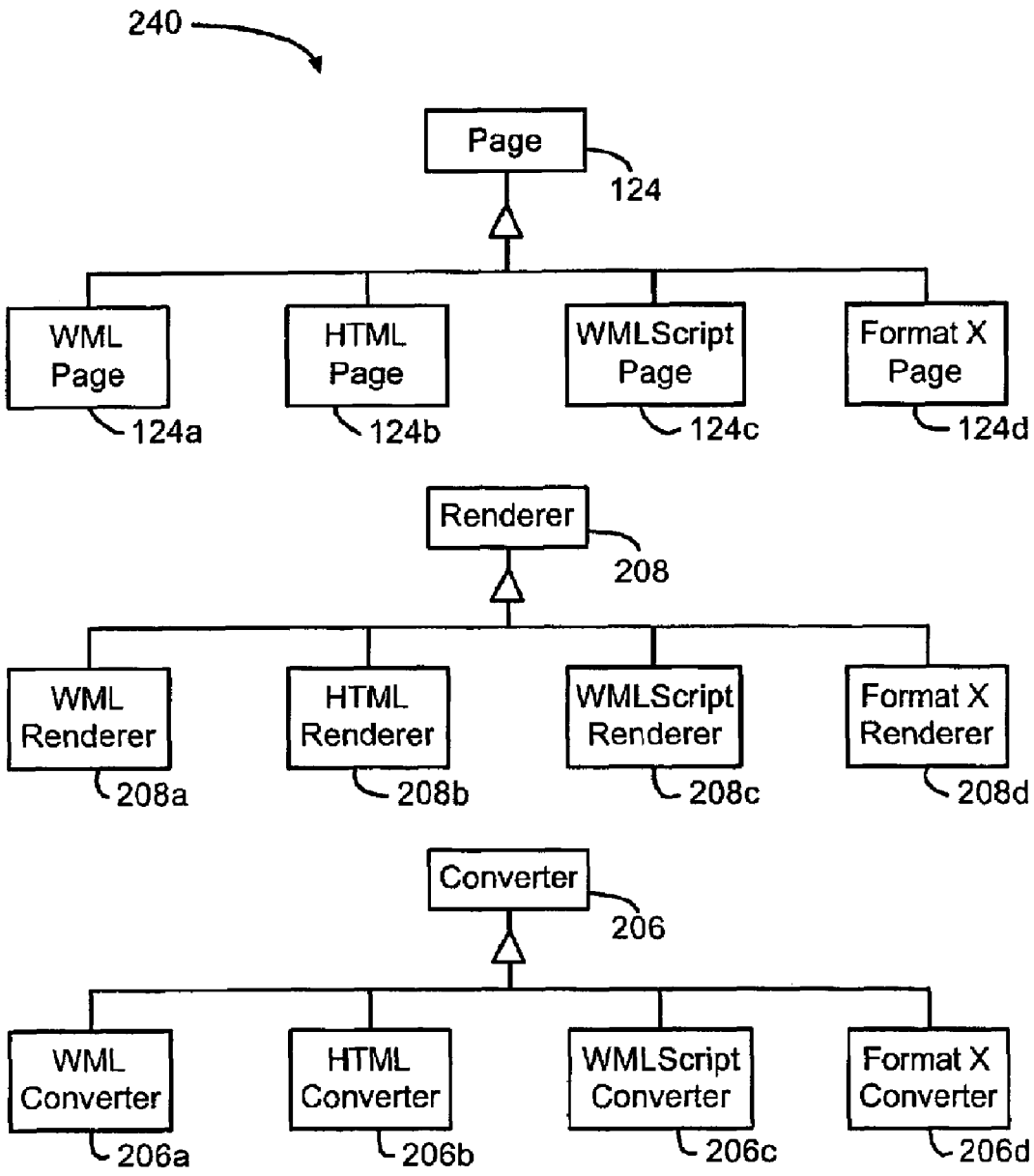
FIG. 4 a block diagram of converter, renderer and page objects.

Referring now to FIG. 4 a block diagram of converter, renderer and page objects is shown generally as 240. Converter object 206 is a superclass object representing all converter objects 206a to 206d. Similarly, renderer object 208 is a superclass object representing all rendering functions 208a, 208b, 208c, and 208d. WML converter object 206a and WML renderer object 208a convert a byte array that contains WMLC (Compiled WML) into a WML page object 124a. HTML converter object 206b and HTML renderer object 208b convert a byte array that contains filtered HTML content into an HTML page object 124b. Similarly, the WMLScript converter object 206c and WMLScript renderer object 208c comprise a rendering engine for WMLScript scripts, which creates WMLScript page objects 124c. Format X converter object 206d and Format X renderer object 208d illustrate the extensibility aspect of the present invention which is described in further below.

Figure 5:
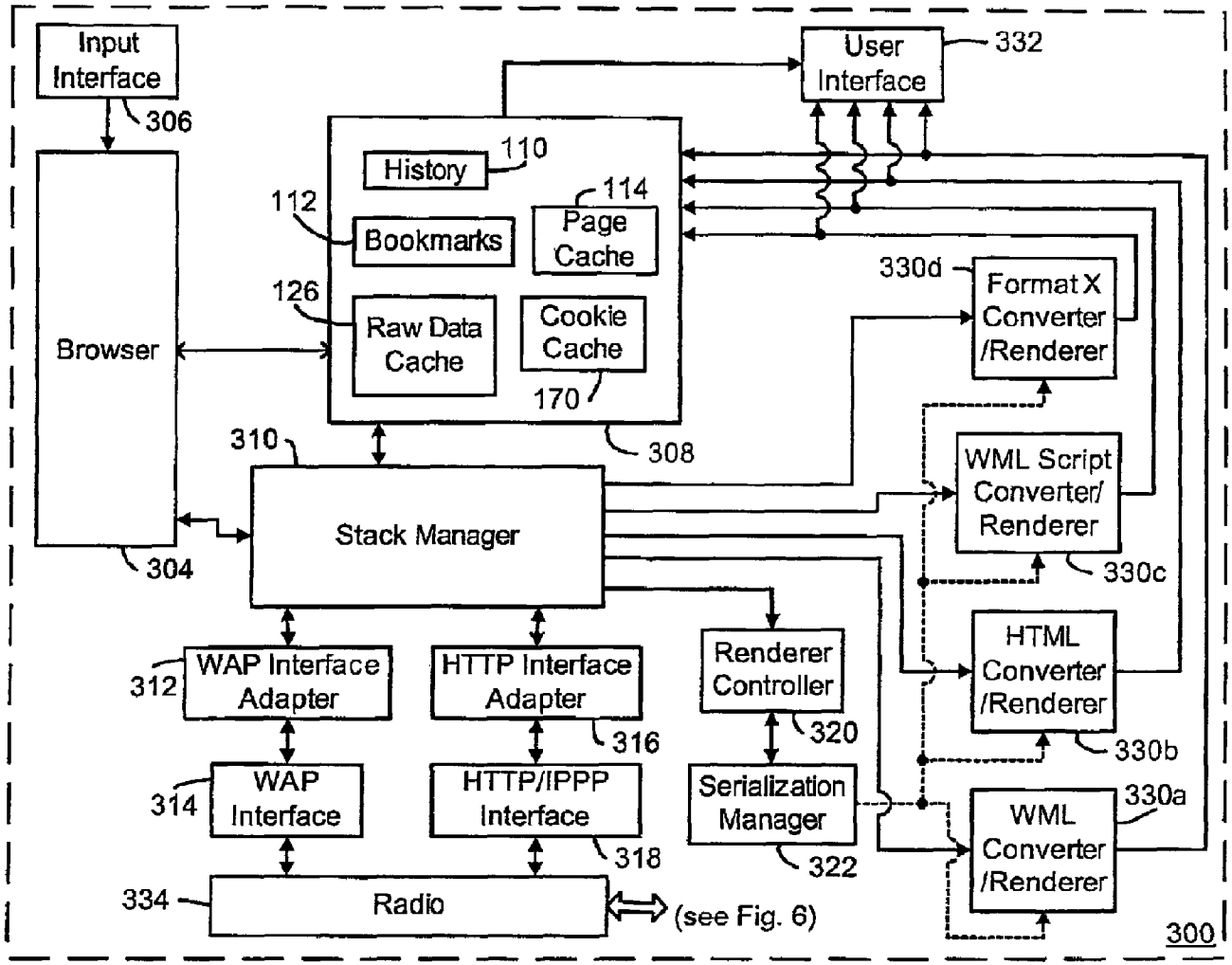
FIG. 5 is a block diagram of an information browsing system utilizing the present invention.

Referring now to FIG. 5 a block diagram of an information browsing system utilizing the present invention is shown as wireless device 300. User input is provided to the main browser control component 304 through input interface 306. It should be noted that the functionality of both browser object 106 and browser daemon 108 is included in component 304. Background operations performed by component 304 involve daemon 108 functionality, whereas foreground operations would be associated with the browser 106.

Depending upon the nature of the user input, component 304 may interact with one or more of the memory lists or caches 110, 112, 114, 126 and 170, in memory 308. Memory 308 may for example be a random access memory (RAM) in which the various caches occupy predetermined storage space or alternatively, dynamically allocated storage space. Memory 308 may also possibly comprise multiple distinct memory elements, each incorporating one or more of the caches.

Wireless device 300 further includes a stack manager 310. Stack manager 310 manages all requests for content, directing them to the appropriate interface adapter 312 or 316. Stack manager 310 further communicates with renderer controller 320 and converter/renderers 330a, 330b, 330c and 330d to ensure incoming data is properly converted and rendered for display to a user. WAP interface 314 and HTTP interface 318 interact with radio 334 to request and obtain data over a wireless network. Renderer controller 320 and serialization manager 322 perform the functions described previously with regard to FIG. 3. User interface 332 may be visual display or any other device that is capable of communicating the results of a browser request to a user. Although shown as single functional blocks 330a, 330b, 330c and 330d, it is to be understood that the converter/renderers perform both the converter and renderer object functions described above to generate pages for display on the device from information received in response to requests. As described above, the renderers are preferably transient objects created by the converters as required and thus are not shown separately in the block diagram.

Radio 334 is a wireless communication module, which operates in a wireless communication network. In a preferred embodiment of the invention radio 334 is a device adapted for communication on the Mobitex network, although communication modules for the DataTAC network, GSM/GPRS networks and other wireless communication systems are also possible. The multiple content type information browsers and associated methods in accordance with the instant invention are independent of the particular wireless network on which the device operates.

Figure 6:
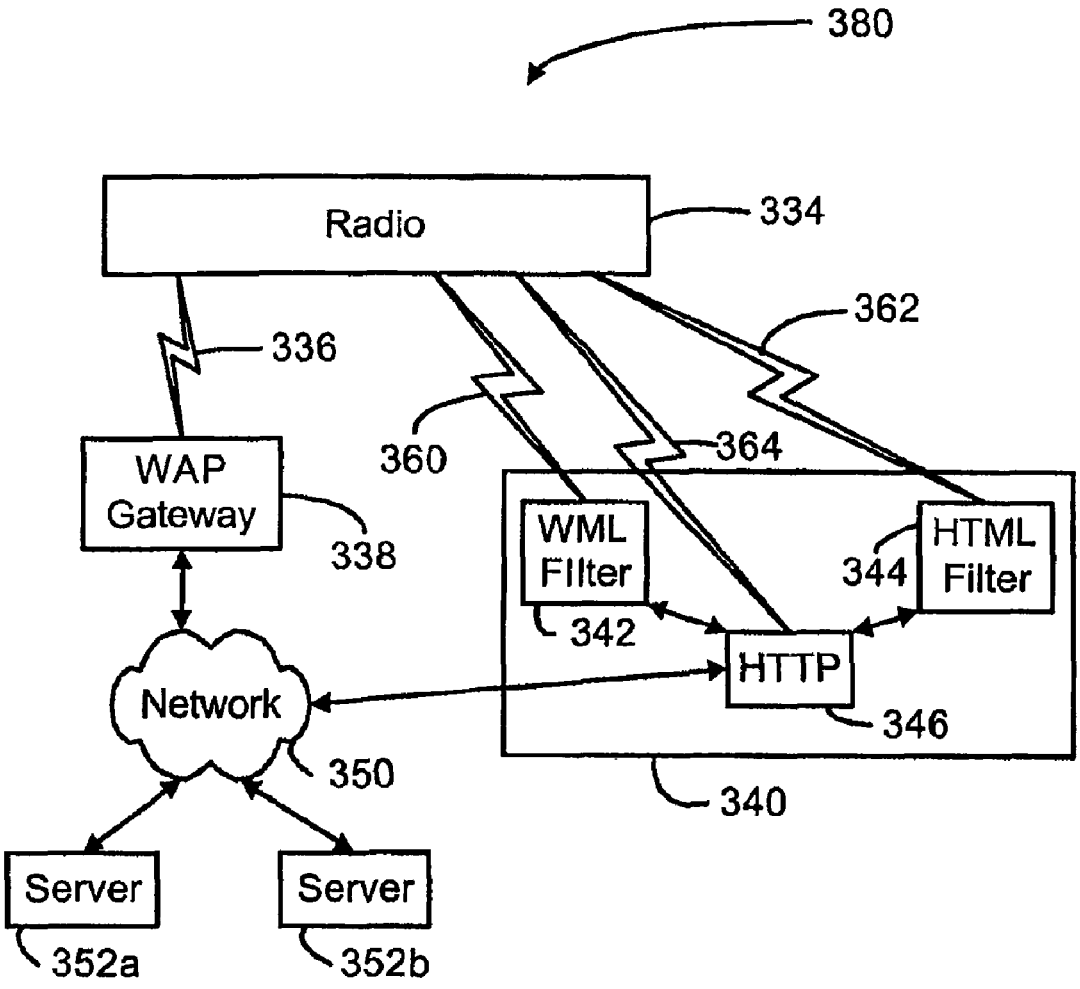
FIG. 6 is a block diagram illustrating communication connections.

Referring now to FIG. 6, a block diagram illustrating communication connections is shown generally as 380. Radio 334 of wireless device 300 communicates over wireless links to a plurality of devices. Communication link 336 connects radio 334 with a WAP gateway 338 or with an IP proxy server 340 via links 360, 362 or 364. Thus, radio 334 is able to utilize either a WAP or HTTP protocol. In a preferred embodiment of the invention, HTTP interface 318 is a proprietary HTTP-over-IPPP stack, such that when HTTP is used for information browsing, radio 334 communicates with an IP proxy server 340 using IPPP. In the embodiment shown in FIG. 6, IP proxy server 340 includes a WML filter 342, an HTML filter 344 and an HTTP connector 346. Filters 342 and 344 respectively convert raw WML and raw HTML content into proprietary filtered formats and return the filtered content to radio 334 via communication links 360 and 362 respectively. A third alternative is unfiltered data and this is performed via communications link 364.

Both WAP gateway 338 and IP proxy server 340 request information or content from information sources such as servers 352a and 352b through a network 350. Network 350 is typically the Internet, but may also be an intranet or other relatively smaller-scale network. WAP gateway 338 and IP proxy server 340 may possibly be connected to different networks. Servers 352a and 352b may be connected to network 350 through one or more further networks. Other information source arrangements will be apparent to those skilled in the art and are intended by the inventors to be within the scope of the invention.

Figure 7:
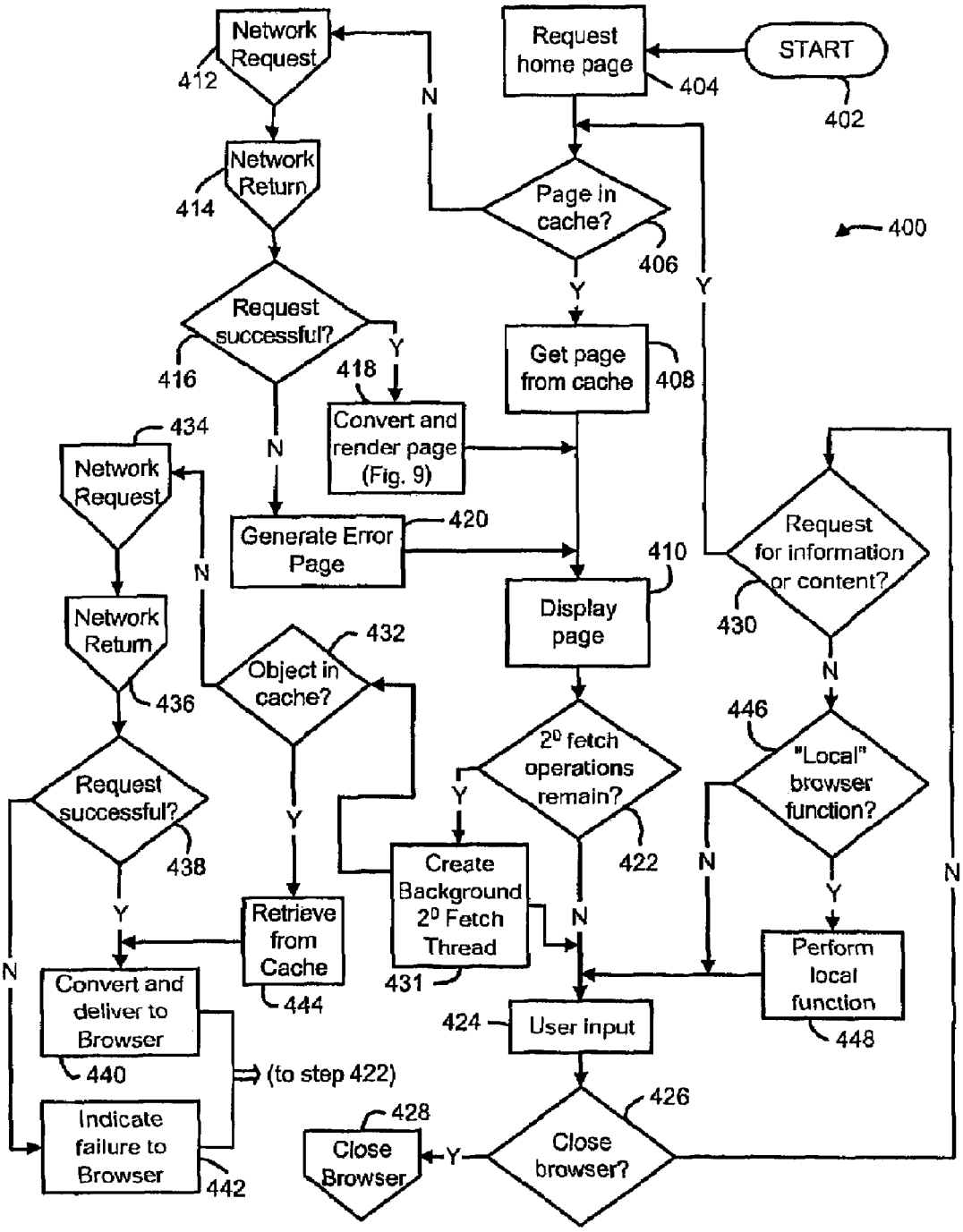
FIG. 7 is a logical flow chart of the process performed by the present invention.

Referring now to FIG. 7, a logical flow chart of the process performed in an illustrative embodiment of the present invention is shown generally as 400. The browser implementing process 400 is preferably pre-programmed with a "home page" URL that it will attempt to load when started at step 402. The browser will first create a request to load the pre-programmed "home page" URL at step 404. It will then enter the normal page-request cycle, which begins with the browser determining if a valid previously rendered copy of the home page is stored in the page cache at step 406. If the home page is stored in the page cache, then the browser can quickly load it from cache at step 408 and display the page at step 410.

If no valid copy of the page is stored in the cache, when the cache copy has expired or has been replaced by a new page entry under a page cache LRU replacement policy for example, the browser attempts to download the home page from the information source through a network request, indicated at step 412. In response to the network request, the network returns information to the browser at step 414, which may be the requested information but may instead be an error message if the requested information cannot be accessed or is otherwise unavailable. A test is made at step 416 to determine if the network request was successful. If it was, i.e. the requested information is returned, the returned content is converted and rendered at step 418. Provided that the home page is either stored in the page cache when the browser is started or downloaded from the network, the home page is displayed by the browser on the device at step 410. If the home page cannot be loaded, control moves from step 416 to step 420 where the browser may generate an error page or selected a predetermined stored page. The error page or predetermined stored page is then displayed at step 410. The error page or predetermined stored page is preferably stored in a memory location not subject to the normal LRU cache replacement scheme. Although browser startup would be simplified by initially displaying a predetermined stored page and thereby avoiding some processing and possibly network access operations, this would preclude a user selecting a personal home page.

As discussed briefly above, converted and rendered pages processed by the browser include not only WML and HTML pages for display, but also WMLScript and other script pages with run elements which are executed by the browser. Therefore, in this description, references to page display should be interpreted to include execution of such run elements for script pages.

After a page has been displayed at step 410, the browser checks at step 422 to see if any secondary ($2^0$) fetches are needed to complete the loading of the current page (e.g., to load images associated with the page). If no secondary fetch operations remain, when either no secondary fetch operations are required or all secondary fetch operations have been performed as described below, control moves to step 424 where the browser awaits input from a user. If a user input request is received, a test is made at step 426 to determine if it is a request to close the browser. If the user has decided to close the browser then closing operations are performed at step 428. If the user did not decide to close the browser, a test is made at step 430 to determine if the user made a request for information or content. An information request may be made by a user by entering a URL or selecting a link on a displayed page, for example. If the user input is a request, then a background operation to load and display a new page is initiated as described above starting at step 406. While this background operation is in progress, the current page that is being displayed will preferably remain on the screen of the browsing device. A static or preferably animated icon will also be displayed on the screen, in a title bar for the currently displayed page for example, to indicate to the user that another page is in the process of being requested and downloaded.

Returning to step 430 if it is determined that the user input is not an information request, a test is made at step 446 to determine if the user input relates to a local browser function, such as storing a URL as a bookmark. If a local function is invoked, then the function is performed at step 448, and control moves to step 424.

If the test at step 422 indicates that secondary fetches are required, each secondary fetch operation preferably proceeds as follows. A background secondary fetch thread is first created at step 431. The method then proceeds at step 424 to detect and process any user inputs. The secondary fetch operation continues in the background, concurrently with any user input-related processing, and begins by first checking the cache for the required content at step 432. If the cache does not contain the required content, then a network fetch sequence is initiated at step 434. In response to the network request, the network returns information to the browser at step 436. A test is made at step 438 to determine if the network operation was successful. If the operation was successful, the content is converted (if necessary) and delivered to the browser at step 440 for incorporation into the currently displayed page. If the network operation was not successful, the browser is notified of the failure at step 442. Control then passes back to step 422. It should be noted that if a primary fetch operation results in a network error, then no secondary fetch operations would be executed. Returning to step 432, if the object is in the cache, it is retrieved from the cache at step 444 and passed on to step 440.

It will be apparent that user input may be received at any time, for example during secondary fetch operations or local function execution. A "stop" user input, intended to interrupt a fetch operation, must be processed immediately, without waiting for a previous fetch operation to complete. Therefore, input user interfaces are preferably continuously monitored, even during execution of other browser operations. Creation of a background secondary fetch thread as shown at 431 allows user inputs to be made and processed while secondary fetch operations proceed in the background.

Figure 8:
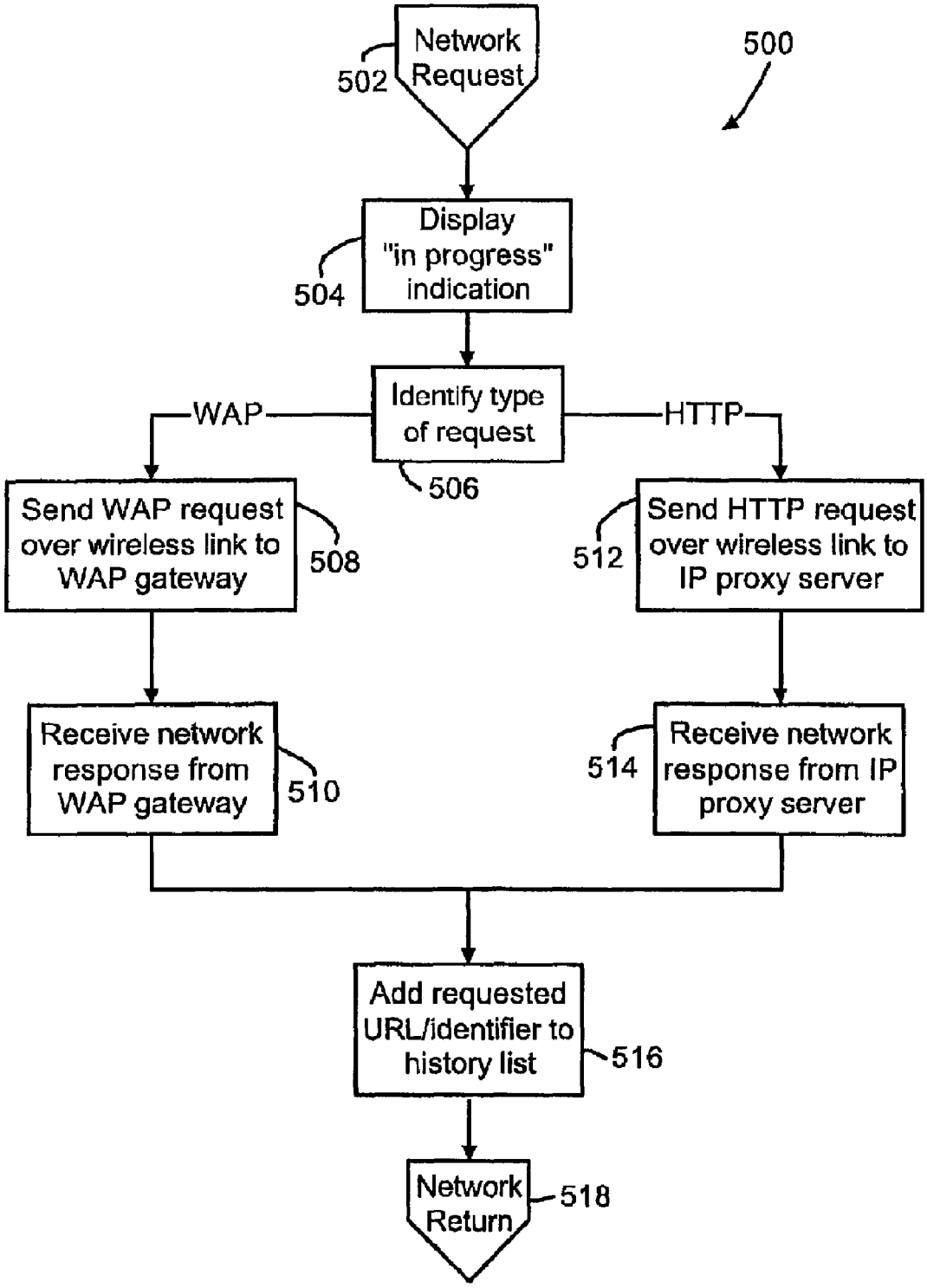
FIG. 8 is a logical flow chart of the process performed by a network request.

Referring now to FIG. 8 a logical flow chart of the process performed by a network request is shown generally as 500. A network request begins at step 502. At step 504 some type of message or indication is preferably displayed to indicate to a user that an information request is in progress. Such a message might also or instead be displayed at other points in the information browsing process, although local operations or page displays from the page cache or other local memory store such as the raw data cache tend to take substantially less time than network information requests. Such user information messages can preferably be configured in accordance with user, network or device preferences or characteristics.

At step 506 the type of request is identified. Only two types of requests, WAP and HTTP, are shown. However, it is not the intent of the inventors to limit the invention in such a manner. Other types of requests may also be accommodated by the invention through further interfaces in the IP proxy server 340 (FIG. 6).

When referring to the remaining steps it will aid the reader to refer to FIGS. 5 and 6 in conjunction with FIG. 8.

A WAP request would be sent at step 508 through WAP interface adapter 312 and WAP Interface 314 over communication link 336 to WAP gateway 338. The requested information would then be downloaded from an information source such as server 352a, through network 350 and WAP gateway 338 and received by radio 334 of device 300 via communications link 336. The information is received at step 510. The information received would normally include the requested information, in raw WML format, but could also be indicative of an error. Based on the response to the network information request, the success or failure of the request can be determined.

HTTP requests are similarly sent through the HTTP interface adapter 316 and HTTP interface 318 to IP proxy server 340 at step 512. HTTP is used by HTTP connector 346 to access information sources through network 350. The format of the returned information content is then determined by HTTP connector 346. The returned information is expected to be raw HTML, but may also be in other formats, such as WML. If a corresponding filter is implemented in IP proxy server 340, then the information is converted into compressed format for transmission over the appropriate wireless communication link, either 360 or 362. If no corresponding filter exists the raw HTML is returned via link 364. Filters 342 and 344 respectively convert raw WML and raw HTML content into proprietary filtered formats, and return the filtered content to the browser. Those skilled in the art will appreciate that filters may be implemented in the IP Proxy system 340 to convert content into other formats that can be processed at the device. The invention is in no way restricted to delivering content in proprietary formats.

At step 516 the URL of the request is added to history list 110. At step 518 the network request is complete and the results are returned to the requester.

When a device is out of wireless communication network coverage, a network request is preferably queued or cached in a device data store and is transmitted when the device re-enters network coverage.

Figure 9:
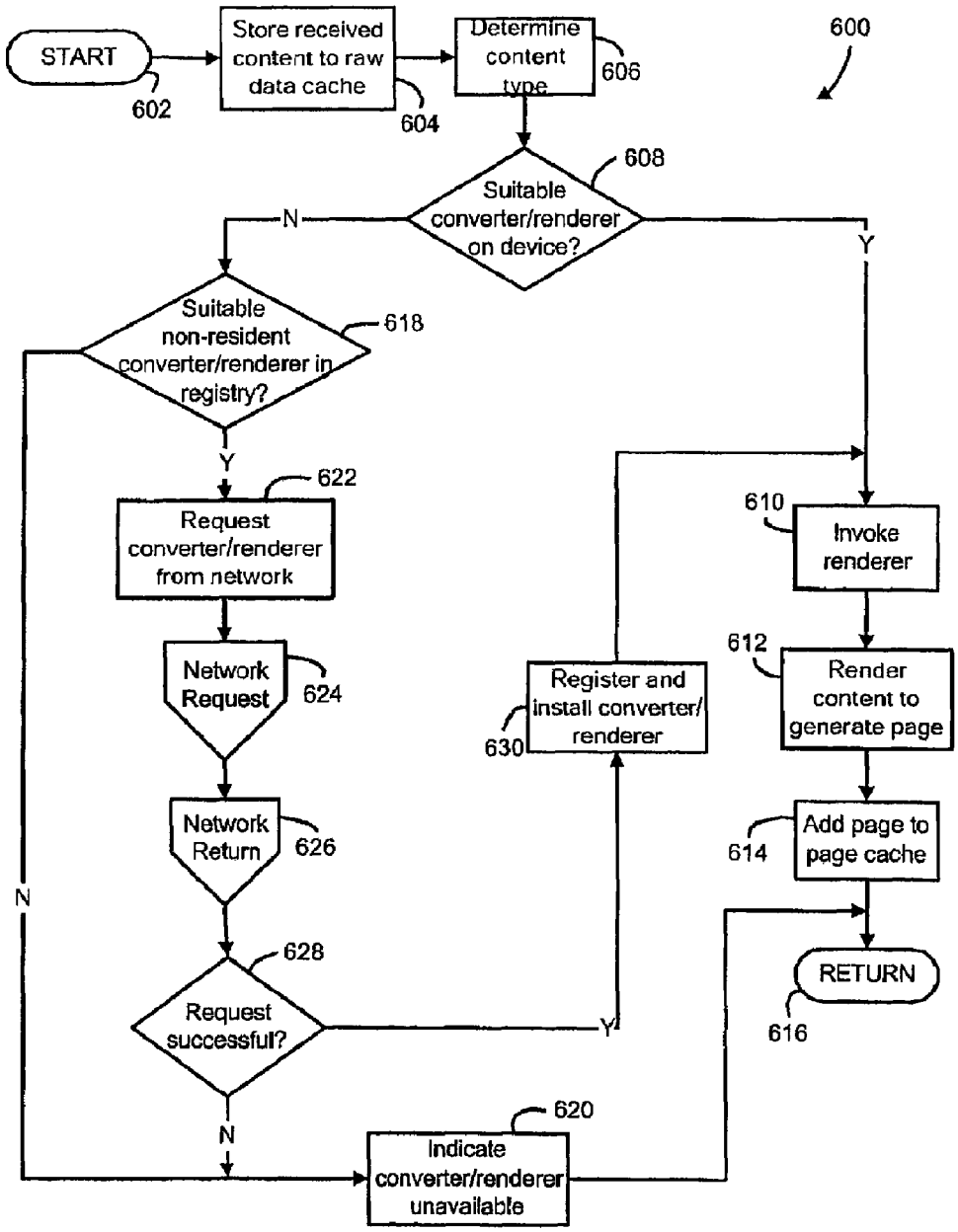
FIG. 9 is a logical flow chart of the process performed by a renderer system.

Referring now to FIG. 9 a logical flow chart of the process performed by a renderer system is shown generally as 600. Process 600 begins at step 602 and information or content received in response to a network request is first stored to the raw data cache at step 604. At step 606 the type or format of the content is determined. Once the type of content has been determined, a test is performed at step 608 to determine if a suitable converter and renderer are on the device. As previously described, resident converters are registered with serialization manager 204/322. If the required converter and renderer are already on the device, processing moves to step 610 where the appropriate renderer is invoked. At step 612 the content is rendered to create a page and at step 614 the page is added to the page cache. Process 600 then returns at step 616.

If at step 608 it is determined that a suitable converter/renderer is not available, control moves to step 618. As previously described, non-resident but available converter/renderers may also be registered with serialization manager 204/322. Serialization manager 204/322 preferably stores both content types for which such non-resident converter/renderers are available and an indication, such as a URL, of a location of the applications. For example, a suitable converter/renderer may be available from a server or an information source accessible through a network in the communication system. At step 618 it is determined whether or not such a non-resident converter/renderer is available for the particular received content type or format. If not, then the browser indicates that the converter/renderer is unavailable at step 620 and the process returns at step 616. In the event that a required converter/renderer is unavailable, the device in which the browser is running preferably displays a most recently downloaded page, along with an indication that the converter/renderer for the requested content is unavailable, in a display title line for example.

Where it is determined at step 618 that a non-resident converter/renderer is available, the converter/renderer is requested from the network at steps 622, 624 and 626. A test is made at step 628 to determine if the network request is successful, if the request was successful then the converter/renderer is registered with the serialization manager and installed in the device at step 630. The new installed converter/renderer is then invoked at step 610 to render the content and generate a page at step 612. At page 614 the generated page is added to the page cache. Control then returns at step 616.

Referring back to FIG. 6, raw WML content from an information source is converted by WAP gateway 338 into a compressed format known as tokenized WML or WMLC. Similarly, WML content and HTML content are converted into compressed formats by filters 342 and 344 in IP proxy server 340. For such content, the example converter objects 206a, 206b, 206c and 206d and renderer objects 208a, 208b, 208c and 208d (see FIG. 3) are sufficient for information browsing functionality. As such, WML, HTML and WMLScript converters and renderers are preferably provided in a communication device by a device manufacturer. However, other types of content may also be simply passed to the device through WAP gateway 338 or IP proxy server 340, requiring further converter/renderers such as the "Format X" converters and renderers 206d and 208d (see FIG. 3). As described above, these further converter/renderers can be either registered with serialization manager 204/322 and installed in the device by a third party or registered with the serialization manager 204/322 for later download and installation to the device at a later time in response to receipt of corresponding content type. In other contemplated embodiments, a user may choose to download, register and install selected converters and renderers to the device.

Figure 10:
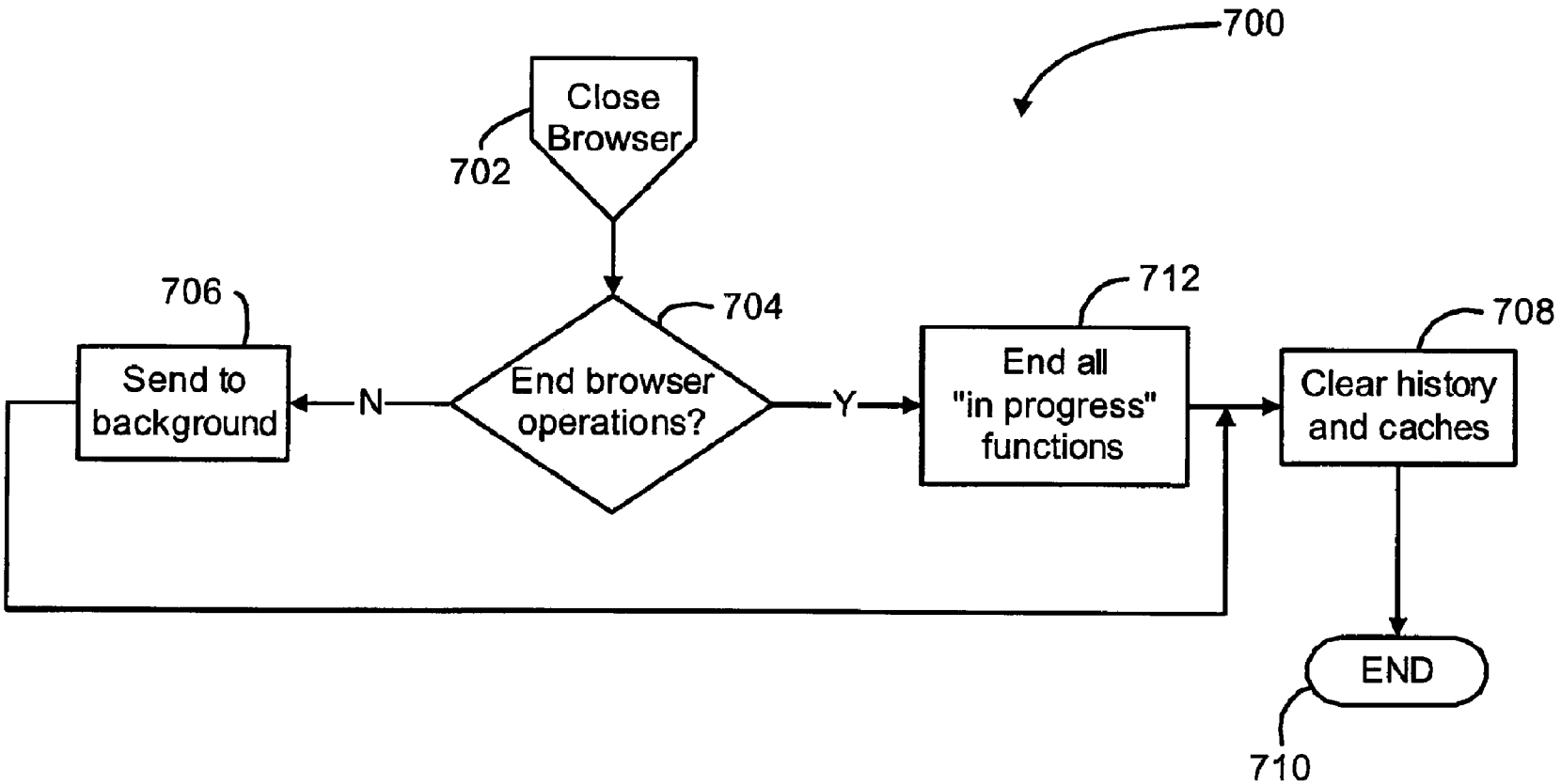
FIG. 10 is a logical flow chart of the process for closing a browser session.

Referring to FIG. 10 a logical flowchart of the process for closing a browser session is shown generally as 700. In the present invention a browser session may be ended or closed temporarily. Beginning at step 702 a user has indicated that the browser session is to be closed. A test is made at step 704 to determine if the input indicates that the browser operations are not to be ended. If the browser operations are not to be ended control moves to step 706. At step 706 the browser is removed from the display of the device on which the browser is running, but operations continue in the background. Upon completion of operations which were in progress when the browser was closed, the history list and caches are cleared at step 708 and browser processing ends at step 710. The next time the browser is opened, it will either reflect its most recent state before the close operation was invoked, or will load a pre-programmed "home page". Any fetch operations in progress at step 706 will preferably have been completed. If the user has selected to end browser operations however, all in progress operation will terminate at step 712. The history list and transient caches may optionally be cleared at step 708 and the browser processing ends at step 710. The next time the browser is started, the home page or alternate stored page is reloaded and displayed. The state of the browser before the close operation is lost.

The present invention may be integrated with other functionality in a communication device. In one such integration, the browser is integrated with a messaging system. The messaging system is preferably an electronic mail (email) based system, which may itself be part of an integrated messaging system including email, voicemail, short messaging service (SMS) and the like.

Figure 11:
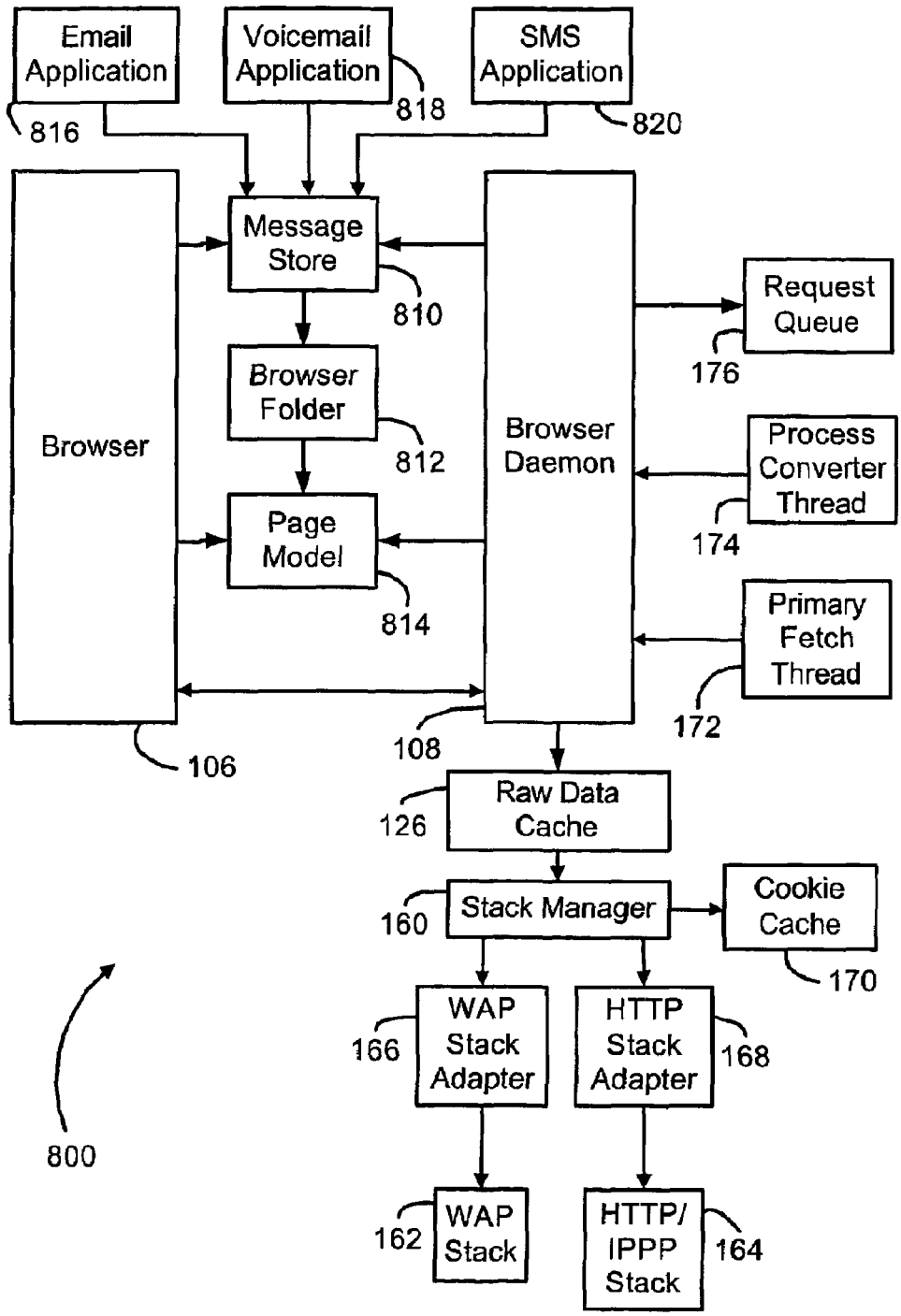
FIG. 11 is a block diagram of the objects and components of the present invention integrated with a messaging system.

Referring now to FIG. 11 a block diagram of the objects and components of the present invention integrated with a messaging system is shown generally as 800. As will be apparent, the objects and components in FIG. 11 are substantially similar to the objects of FIG. 2, but include a message store 810, a browser folder 812 within the message store 810 and a page model 814 within browser folder 812.

As shown in FIG. 11, a central object in the integrated system is the message store 810, which interfaces with the browser object 106, browser daemon 108 and other systems within the device, such as an email application 816, a voicemail application 818 and a SMS application 820. Any of these applications can save items to message store 810 and process corresponding items from message store 810, typically in a folder dedicated to that application. Browser folder 812 is an example of such a folder. Browser folder 812 will contain messages specific to browser requests. Page model 814 is an instance of browser folder 812 that contains the data necessary to display a page.

Information browser 800 also includes the objects shown in FIGS. 1, 3 and 4, and browsing operations are substantially as described above. A primary difference between the browser of FIG. 2 and the browser of FIG. 11 is that browser 800 may be launched directly, as previously described, but may also be launched from a different application such as email application 816, voicemail application 818 or SMS application 820.

Figure 12:
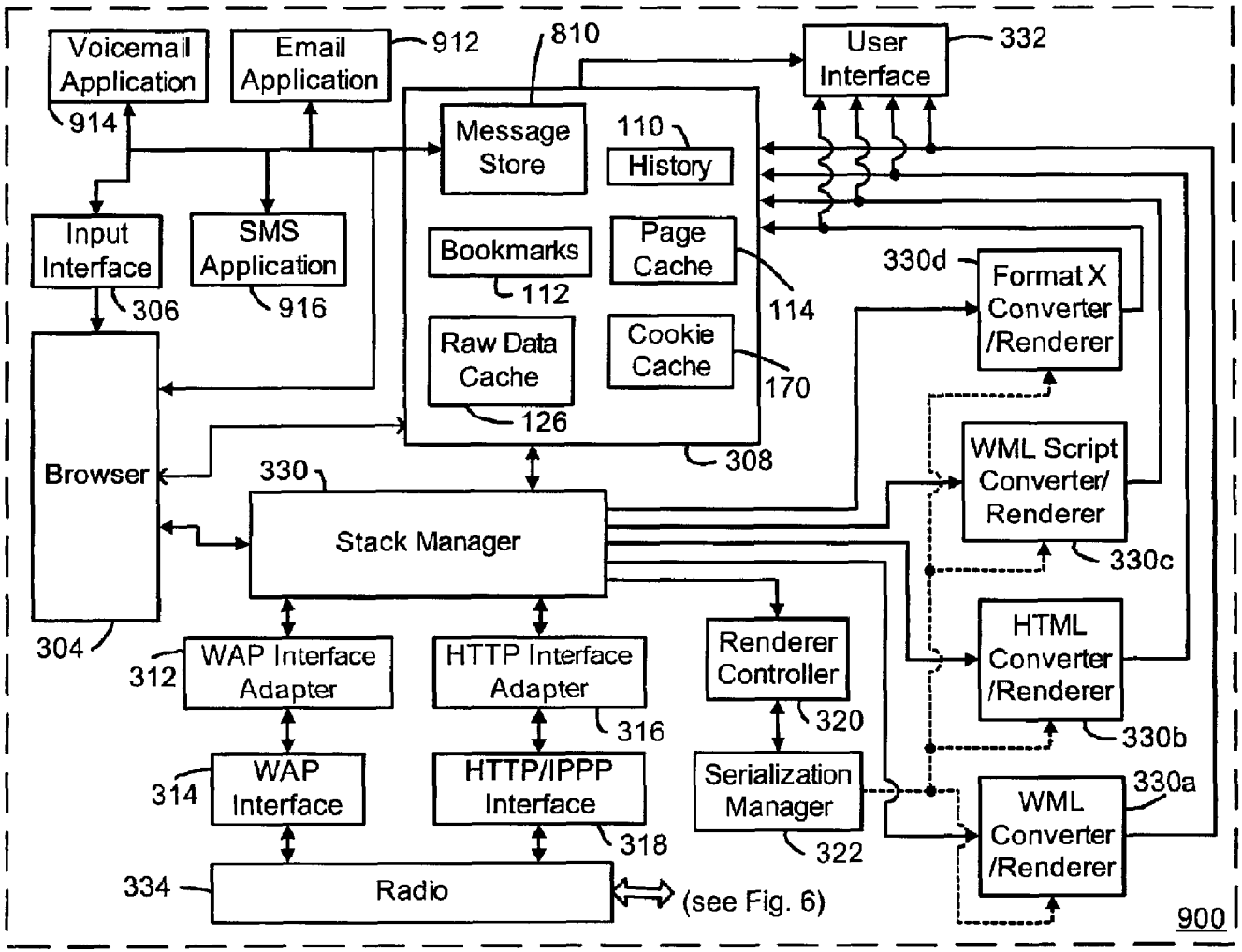
FIG. 12 is a block diagram of an information browsing system utilizing the present invention integrated with a messaging system.

Referring now to FIG. 12, a block diagram of an information browsing system utilizing the present invention integrated with a messaging system is shown as wireless device 900. As can be readily seen device 900 and device 300 of FIG. 5 have many common components, with some minor differences. Wireless device 900 differs from wireless device 300 in that it includes a message store 810, which may for example be allocated a portion of a memory 308. Message store 810 is accessible to other applications such as email application 912, voicemail application 914 and SMS application 916. Although shown in FIG. 12 as being within a shared memory 308, message store 810 may instead be implemented in a dedicated memory component shared among the different messaging functions on device 900.

Browser 304 may be initiated through user input or combination of user inputs from a keyboard or keypad, trackwheel, mouse, thumbwheel or the like, through user interface 306. Browser 304 may also be invoked through message store 810. A list of contents of the message store, hereinafter called the message list, is normally displayed on a screen or other output user interface 332 of wireless device 900. The message list preferably displays a plurality of types of messages. For example, email messages, voicemail messages and SMS messages are preferably displayed in the message list with at least one of sender information, title information and time of receipt, in addition to unique icons. Browser entries in the message list are similarly displayed with one or more particular icons and a content identifier, such as a filename or the URL of a network location associated with the browser entry. Icons for browser entries could represent: pending page, sending page, received page and read page. A pending page is a page that is scheduled to be sent once network conditions will allow it. A sending page is a page that is being sent or a response that is being received. A received page is a page that has been received but not opened. A Read page is a page that has been opened. Further, pages that contain WMLScript "do" elements may have a separate icon to identify them.

Figure 13:
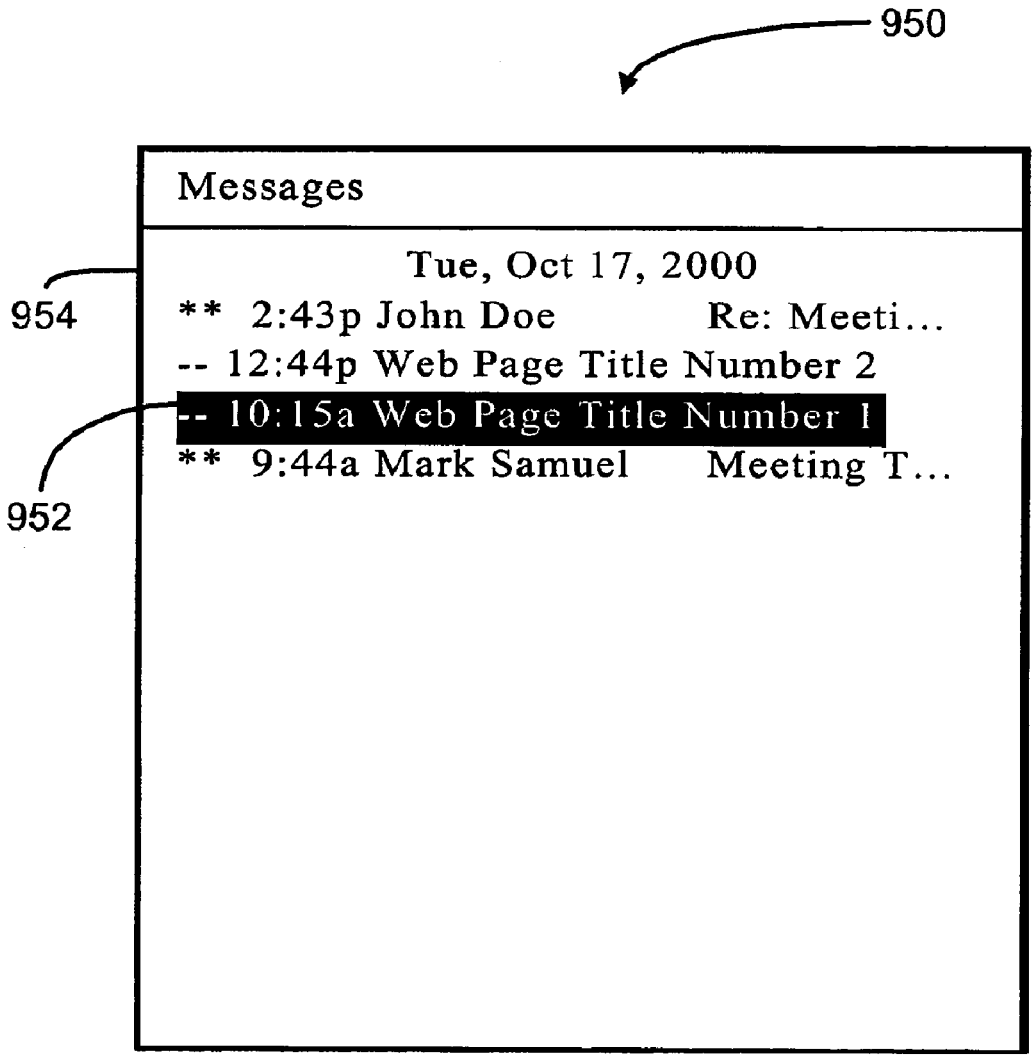
FIG. 13 is a screen capture of a message list.

Referring now to FIG. 13, a screen capture of an example message list is shown generally as 950. A message from email application 816 is indicated by feature 954 and a browser entry is indicated by feature 952. A browser entry 952 may be highlighted to indicate that the page requested resides in the page cache 114 or raw data cache 126.

Figure 14:
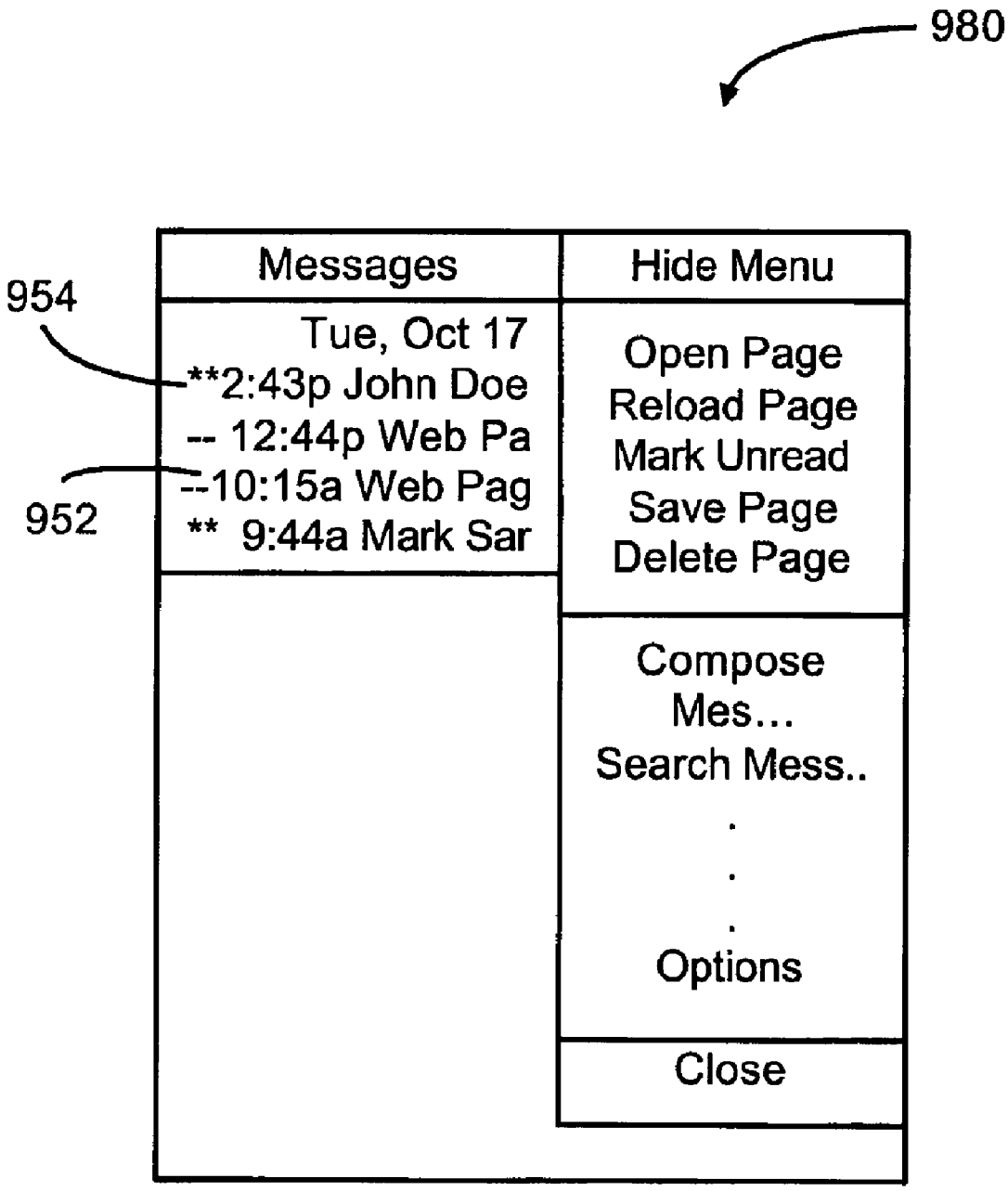
FIG. 14 is a screen capture of a message list browser menu.

Referring now to FIG. 14, a screen capture of a message list browser menu is shown generally as 980. When a cursor or other selection indicator is placed over a browser entry 952 on the message list and suitable selection input is received, a browser menu such as 980 is displayed. Suitable selection input may for example be the depression of a particular key on a keypad or keyboard, operation of an auxiliary input device or placement of a stylus on the display or screen on which the message list is displayed. Browser menu 980 is specific to the message list and provides options that are consistent with viewing a particular type of message. When a browser item is selected, a message list browser menu is displayed. When an email message in the message list is highlighted or otherwise selected however, a menu including email message options would be displayed.

As an example, wireless device 900 may be a hand held electronic device such as those disclosed in co-pending U.S. Pat. No. 6,278,442, titled "HandHeld Electronic Device With a Keyboard Optimized for Use With the Thumbs", issued on Aug. 21, 2001, and assigned to the assignee of the instant invention. In such devices, a cursor is positioned in the message list by rotation of a thumbwheel. A message list selection is made by depressing the thumbwheel. A browser menu may also be displayed by simply providing the selection input while the cursor or selection indicator is positioned in a particular display area outside the message list entries. Whenever suitable selection input is provided, a browser menu applicable to the context of the position of the selection indicator is displayed.

The particular operations included in the browser menus will be dependent upon such criteria as the location of the cursor or selection indicator on the device display, the device in which the browser is implemented, the required or desired browser functionality and/or the communication system in which the device is operating.

Figure 15:
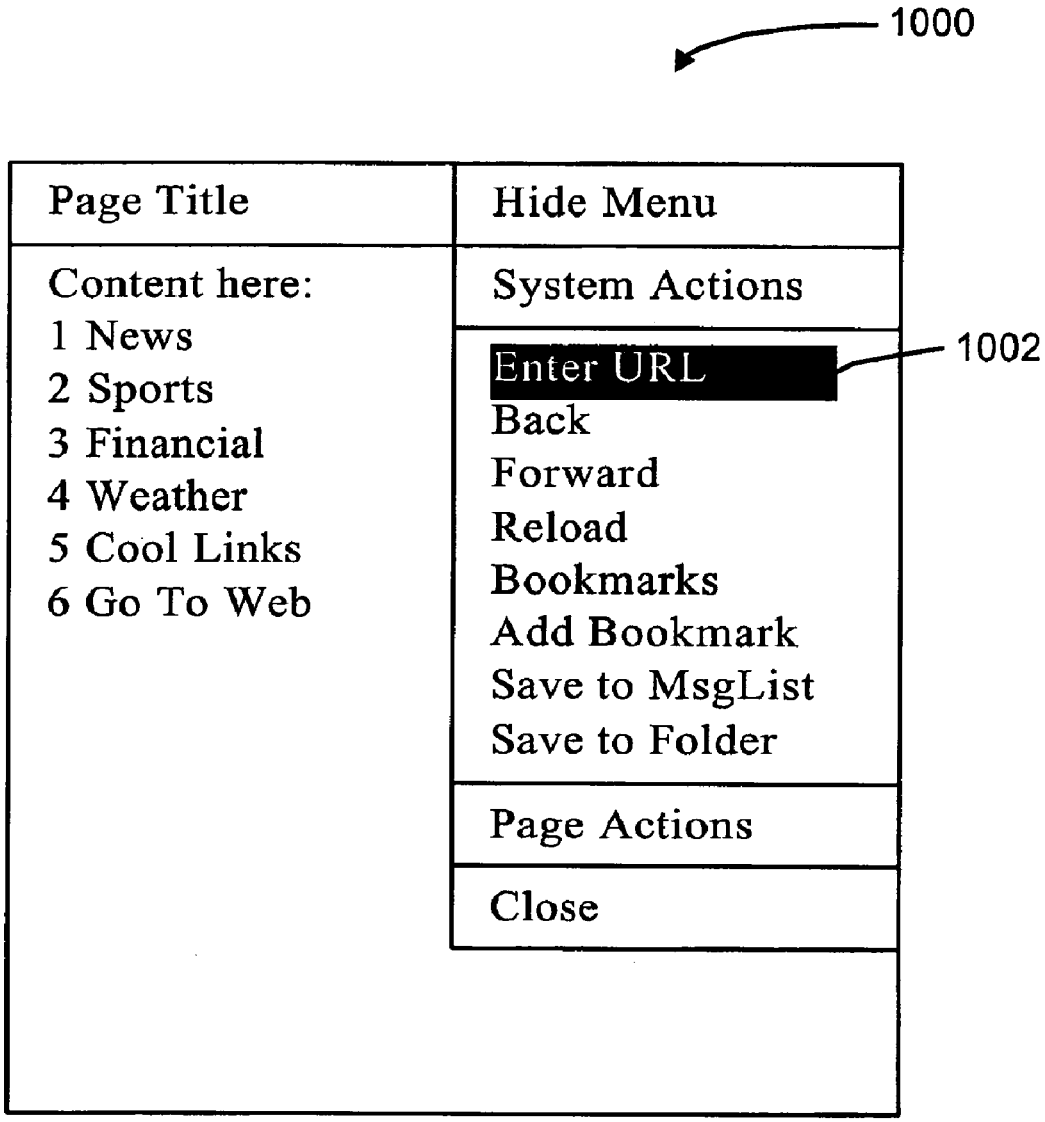
FIG. 15 is a screen capture of a generic browser menu.

Referring now to FIG. 15, a screen capture of a generic browser menu is shown generally as 1000. A browser menu may include certain generic browser actions or functions that apply to all browser content types. Generic actions include such actions as enter URL 1002, back, forward, reload, bookmarks, add bookmark, stop, save current page to message list and save current request to message list. Not all of these features are shown in FIG. 15. Browser menu options are preferably selected in the same way as message list entries, by first positioning a cursor or selection indicator and then providing a selection input. It should be noted that a message list browser menu such as shown in FIG. 14 and a browser menu displayed when the browser application is running (FIG. 15) may be different, since not all browser-related functions are applicable when a single browser item is selected from the message list. For example, a "back" browser function would not be applicable in the context of a single browser item in a message list.

As will be apparent to those skilled in the art, enter URL 1002 allows a user to key in or otherwise specify a URL to be loaded and displayed. The browser then operates as described above to load the requested content from either the page cache or a network. The "back" and "forward" options will be displayed only where appropriate, as determined by the browser by accessing the history list 110. Those skilled in the art will be familiar with "reload", "bookmarks" and "add bookmark" and "stop" browser operations.

Selection of the "save page to message list" option adds the currently displayed page to message store 810 (FIG. 11) and thus to the message list. Where an information request is in progress, the "save request to message list" option will also be made available to the user. Selecting this option will cause the requested page or an identifier thereof such as its URL, to be saved to the message list. Such a save operation may also involve a particular folder, such as a browser folder 812 (FIG. 11), instead of the message list. Similarly, entries saved to a particular folder can preferably be moved to different folders by displaying a menu when the selection indicator is positioned over the entry to be moved. All of the above menu actions, except the fetch operations associated with an "enter URL" action, would be local browser functions performed at step 448 of the flow chart of FIG. 7.

In addition to the generic browser actions, a browser menu preferably includes page specific actions when the selection input is provided while the cursor or selection indicator is positioned over a particular entry in the message list or when a page is being displayed. For example, when a WML page is being displayed, page actions preferably enable a user to execute "do" verbs associated with the page. For an HTML page, the page actions may include an action to follow a link on the displayed page.

Browser menus preferably also include a close action, which would invoke the operations described with regard to FIG. 10. Requests in progress when the browser is closed may be either terminated or executed as background operations, as discussed above. If an information request is completed after the browser has been closed, then the returned content is preferably stored directly to message store 810. If desired, and the browser is suitably configured, a user could then be notified of completion of the request.

Integration of the browser and browsing method with messaging functions provides for further enhanced information browsing on wireless communication devices. One of the problems associated with known information browsers is that connection of the browser to a network is assumed and often required for the duration of a browsing session. In the present invention, a request generated while the device is out of coverage may also be stored to the message store 810 for submission automatically when the device re-enters a coverage area of a wireless network. The browser daemon 108 can detect pending requests by checking the message store 810 list and perform the necessary fetch operations as described above.

It will be appreciated that the above description relates to preferred embodiments by way of example only. Many variations on the invention will be obvious to those knowledgeable in the field, and such obvious variations are within the scope of the invention as described and claimed, whether or not expressly described.

For example, other actions may be provided in the browsing menus. Such other actions may be either in addition to the actions described above or alternatives thereto. The present invention may also be integrated with different functions, applications or systems on a wireless communication device. The invention is in no way restricted to integration with messaging functions.

Similarly, the invention is not limited to implementation in any particular type of hand-held electronic device. The invention may be implemented in virtually any wireless communication device, including cellular telephones, mobile communication devices, personal digital assistants (PDAs), two-way pagers and the like.

Although the inventors have described the present invention as being used in a wireless communication device, one can appreciate that certain features, for example the renderer/controller structure may be implemented in non-wireless systems as well. Similarly, any non-wireless system may make use of the background processing feature of the present invention to continue to attempt to access data once the browser has been shut down.

The invention claimed is:

1. A web browser for a wireless communication device, the web browser comprising:

a page cache resident on the wireless communication device, the page cache containing a plurality of pages comprising content rendered in a plurality of formats;

a plurality of first converters resident on the wireless communication device, the plurality of first converters configured to create a plurality of first renderers, the plurality of first renderers operatively connected to the page cache to add the pages comprising rendered content to the page cache, the plurality of first renderers for rendering the plurality of pages from information received in response to a plurality of requests for the content for display by the web browser in a format compatible with a user interface implemented in the wireless communication device;

a renderer controller resident on the wireless communication device, the renderer controller configured to examine, in response to each of the plurality of requests, a resultant content type and to determine at least one second converter configured to create at least one second renderer required to render one of the plurality of pages for display by the web browser in the format compatible with the user interface implemented in the wireless communication device; and a serialization manager resident on the wireless communication device, the serialization manager configured to maintain a registry of converters registered with the serialization manager, to register the plurality of first converters resident on the wireless communication device in the registry of converters, and to determine whether each of the at least one second converter is a first converter registered in the registry of converters and is resident on the wireless communication device;

wherein said wireless communication device comprises a radio configured for communications with both a Wireless Application Protocol gateway and an Internet Protocol proxy server.

2. The web browser of claim 1, the proxy server further comprising a Wireless Markup Language filter.

3. The web browser of claim 1, the proxy server further comprising a Hypertext Markup Language filter.

4. The web browser of claim 1, the proxy server further comprising a Hypertext Transfer Protocol connector.

5. A web browser for a wireless communication device, the web browser comprising:

a page cache resident on the wireless communication device, the page cache containing a plurality of pages comprising content rendered in a plurality of formats;

a plurality of first converters resident on the wireless communication device, the plurality of first converters configured to create a plurality of first renderers, the plurality of first renderers operatively connected to the page cache to add the pages comprising rendered content to the page cache, the plurality of first renderers for rendering the plurality of pages from information received in response to a plurality of requests for the content for display by the web browser in a format compatible with a user interface implemented in the wireless communication device;

a renderer controller resident on the wireless communication device, the renderer controller configured to examine, in response to each of the plurality of requests, a resultant content type and to determine at least one second converter configured to create at least one second renderer required to render one of the plurality of pages for display by the web browser in the format compatible with the user interface implemented in the wireless communication device; and a serialization manager resident on the wireless communication device, the serialization manager configured to maintain a registry of converters registered with the serialization manager, to register the plurality of first converters resident on the wireless communication device in the registry of converters, and to determine whether each of the at least one second converter is a first converter registered in the registry of converters and is resident on the wireless communication device;

the web browser further comprising a browser daemon, the browser daemon permitting the web browser to access information after the web browser has been closed.

6. The web browser of claim 5, further comprising a message store, the message store containing processing results from the browser daemon, the message store accessible to one or more applications to permit display of the processing results.

7. The web browser of claim 6, wherein the message store comprises at least one browser folder.

8. The web browser of claim 7, wherein the at least one browser folder comprises at least one page model.

9. The web browser of claim 5, wherein the browser daemon stores information requests from the web browser and automatically sends stored requests over a wireless communication network when the device is within a coverage area of the network.

10. A web browser for a wireless communication device, the web browser comprising:

a page cache resident on the wireless communication device, the page cache containing a plurality of pages comprising content rendered in a plurality of formats;

a plurality of first converters resident on the wireless communication device, the plurality of first converters configured to create a plurality of first renderers, the plurality of first renderers operatively connected to the page cache to add the pages comprising rendered content to the page cache, the plurality of first renderers for rendering the plurality of pages from information received in response to a plurality of requests for the content for display by the web browser in a format compatible with a user interface implemented in the wireless communication device;

a renderer controller resident on the wireless communication device, the renderer controller configured to examine, in response to each of the plurality of requests, a resultant content type and to determine at least one second converter configured to create at least one second renderer required to render one of the plurality of pages for display by the web browser in the format compatible with the user interface implemented in the wireless communication device;

a serialization manager resident on the wireless communication device, the serialization manager configured to maintain a registry of converters registered with the serialization manager, to register the plurality of first converters resident on the wireless communication device in the registry of converters, and to determine whether each of the at least one second converter is a first converter registered in the registry of converters and is resident on the wireless communication device; and a message store, the message store connected to at least one application selected from the set of: email application, voicemail application and SMS application, and the message store containing objects retrieved by the web browser and the at least one application.

11. The web browser of claim 10, wherein the message store comprises at least one folder.

12. The web browser of claim 11, wherein the at least one folder includes at least one page model.

13. The web browser of claim 12, wherein the message store also contains requests for information from the web browser.

14. The web browser of claim 13, wherein the requests for information from the web browser are maintained in the message store until requested information is received in response thereto.

15. The web browser of claim 14, wherein a stored request for information is replaced with the requested information in the message store.

16. The web browser of claim 10, wherein an object retrieved by the web browser contained within the message store may be selected to initiate an instance of the web browser.

17. A web browser for a wireless communication device, the web browser comprising:

a page cache resident on the wireless communication device, the page cache containing a plurality of pages comprising content rendered in a plurality of formats;

a plurality of first converters resident on the wireless communication device, the plurality of first converters configured to create a plurality of first renderers, the plurality of first renderers operatively connected to the page cache to add the pages comprising rendered content to the page cache, the plurality of first renderers for rendering the plurality of paces from information received in response to a plurality of requests for the content for display by the web browser in a format compatible with a user interface implemented in the wireless communication device;

a renderer controller resident on the wireless communication device, the renderer controller configured to examine, in response to each of the plurality of requests, a resultant content type and to determine at least one second converter configured to create at least one second renderer required to render one of the plurality of pages for display by the web browser in the format compatible with the user interface implemented in the wireless communication device;

a serialization manager resident on the wireless communication device, the serialization manager configured to maintain a registry of converters registered with the serialization manager, to register the plurality of first converters resident on the wireless communication device in the registry of converters, and to determine whether each of the at least one second converter is a first converter registered in the registry of converters and is resident on the wireless communication device;

a browser object operatively connected to a browser daemon;

a stack manager operatively connected to the browser object and the browser daemon; the stack manager further connected to a wireless radio via a plurality of interface adapters; and the radio connected to a plurality of communication links, the communication links providing information to and sending information from the browser object and the browser daemon.

18. The web browser of claim 17, wherein the communication links comprise links to a Wireless Application Protocol gateway and an Internet Protocol proxy server.

19. The web browser of claim 18, wherein the proxy server comprises a Wireless Markup Language filter.

20. The web browser of claim 19, wherein the IP proxy server comprises an Hypertext Markup Language filter.

21. The web browser of claim 19, wherein the IP proxy server comprises an Hypertext Transfer Protocol connector.

22. A web browser for a wireless communication device, the web browser comprising:

a page cache resident on the wireless communication device, the page cache containing a plurality of pages comprising content rendered in a plurality of formats;

a plurality of first converters resident on the wireless communication device, the plurality of first converters configured to create a plurality of first renderers, the plurality of first renderers operatively connected to the page cache to add the pages comprising rendered content to the page cache, the plurality of first renderers for rendering the plurality of pages from information received in response to a plurality of requests for the content for display by the web browser in a format compatible with a user interface implemented in the wireless communication device;

a renderer controller resident on the wireless communication device, the renderer controller configured to examine, in response to each of the plurality of requests, a resultant content type and to determine at least one second converter configured to create at least one second renderer required to render one of the plurality of pages for display by the web browser in the format compatible with the user interface implemented in the wireless communication device; and a serialization manager resident on the wireless communication device, the serialization manager configured to maintain a registry of converters registered with the serialization manager, to register the plurality of first converters resident on the wireless communication device in the registry of converters, and to determine whether each of the at least one second converter is a first converter registered in the registry of converters and is resident on the wireless communication device;

wherein the wireless communication device is a device selected from the group consisting of: a cellular telephone, a personal digital assistant, and a two-way pager.

* * * * *